(12) United States Patent
Bristow

(10) Patent No.: US 10,729,136 B2
(45) Date of Patent: Aug. 4, 2020

(54) SYNERGISTIC HERBICIDAL COMPOSITION AND USE THEREOF

(71) Applicant: ROTAM AGROCHEM INTERNATIONAL COMPANY LIMITED, Chai Wan (HK)

(72) Inventor: James Timothy Bristow, Chai Wan (HK)

(73) Assignee: ROTAM AGROCHEM INTERNATIONAL COMPANY LIMITED, Chai Wan (HK)

( * ) Notice: Subject to any disclaimer, the term of this patent is extended or adjusted under 35 U.S.C. 154(b) by 256 days.

(21) Appl. No.: 14/926,086

(22) Filed: Oct. 29, 2015

(65) Prior Publication Data

US 2017/0118986 A1    May 4, 2017

(51) Int. Cl.
*A01N 47/36* (2006.01)
*A01N 41/10* (2006.01)
*A01N 25/12* (2006.01)

(52) U.S. Cl.
CPC .............. *A01N 47/36* (2013.01); *A01N 25/12* (2013.01); *A01N 41/10* (2013.01)

(58) Field of Classification Search
CPC ................................................ C07B 2200/13
See application file for complete search history.

(56) References Cited

U.S. PATENT DOCUMENTS

| 4,954,628 A | 9/1990 | Besenyei et al. |
| 5,559,237 A | 8/1996 | Chiang et al. |
| 2015/0031877 A1 | 1/2015 | Hiratsuka |

FOREIGN PATENT DOCUMENTS

| EP | 0030138 A1 | 6/1981 |
| EP | 0318276 A1 | 5/1989 |
| EP | 0318276 | 11/1998 |
| WO | 2006021743 | 3/2006 |

OTHER PUBLICATIONS

Vippagunta et al., Crystalline solids, Advanced Drug Delivery Reviews (2001), vol. 48, pp. 3-26.*
Remington's Pharmaceutical Sciences (17th Ed. 1985), p. 1585.*
Crystallization—Science and Technology (2012), pp. 183-204.*
Braga et al., Crystal Growth & Design (2014), vol. 14, pp. 1430-1437.*
International Search Report and Written Opinion regarding PCT/CN2016/098340 dated Nov. 30, 2016.
Li, Zhixiang A Purify Method for Metsulfuron-Methyl Pesticide Science for Administration Aug. 15, 1998 (Aug. 15, 1998) No. 3 vol. 19 ISSN: 1002-5480 p. 9.
Hu, Xianwen et al. Purification, Characterization and Determination of Metsulfuron. Hubei Agricultural Sciences Sep. 30, 2003 (Sep. 30, 2003) No. 5 ISSN: 0439-8114 pp. 51-52.
Caira, Mino R. Crystalline Polymorphism of Organic Compounds Topics in Current Chemistry Jan. 1, 1998 (Jan. 1, 1998) vol. 198 ISSN: 0340-102 pp. 163-208.
HCAPLUS abstract 1999:261209 (1999).
Roberts, R.M. et al. Modern Experimental Organic Chemistry. Holt, Rinehart and Winston, New York, 1979, pp. 49-58.
McClurg, R.B., "X-Ray Powder Diffraction (XRPD) to Describe Crystal Forms," Publication of SSCI an Aptuit Company, Jul. 9, 2008, pp. 1-23.

* cited by examiner

*Primary Examiner* — John Pak
(74) *Attorney, Agent, or Firm* — Dickinson Wright PLLC

(57) ABSTRACT

A herbicidal composition is provided, the composition comprising: (A) the crystalline modification I of 2-(4-mesyl-2-nitrobenzoyl)cyclohexane-1,3-dione (mesotrione); and (B) the crystalline modification I of methyl 2-[[[[(4-methoxy-6-methyl-1,3,5-triazin-2-yl)amino]carbonyl]amino]sulfonyl]benzoate (metsulfuron-methyl). A method of controlling plant growth at a locus comprises applying to the locus herbicidally effective amounts of both (A) the crystalline modification I of 2-(4-mesyl-2-nitrobenzoyl)cyclohexane-1,3-dione (mesotrione); and (B) the crystalline modification I of methyl 2-[[[[(4-methoxy-6-methyl-1,3,5-triazin-2-yl)amino]carbonyl]amino]sulfonyl]benzoate (metsulfuron-methyl).

32 Claims, 8 Drawing Sheets

PXRD Data for Mesotrione Form 1

| Peak Position (2-Theta) | Peak Position (d spacing) | Counts |
|---|---|---|
| 8.52 | 10.34 | 13753 |
| 17.08 | 5.18 | 53322 |
| 17.43 | 5.08 | 39907 |
| 18.74 | 4.73 | 10146 |
| 19.04 | 4.66 | 8680 |
| 19.31 | 4.59 | 9582 |
| 19.52 | 4.54 | 7440 |
| 21.15 | 4.20 | 23786 |
| 25.73 | 3.46 | 42162 |
| 28.66 | 3.11 | 21081 |

| Peak Position (2-Theta) | Peak Position (d) | Counts |
|---|---|---|
| 15.98 | 5.54 | 19978 |
| 19.05 | 4.66 | 25928 |
| 20.32 | 4.37 | 14558 |
| 20.60 | 4.31 | 16683 |
| 22.55 | 3.94 | 17002 |
| 23.28 | 3.82 | 22634 |
| 27.14 | 3.28 | 5526 |
| 27.60 | 3.23 | 5738 |
| 28.63 | 3.12 | 11689 |

Comparison of the C13 nmr Spectra for form 1 and 2 of Mesotrione

| Form 1 (ppm) | Form 2 (ppm) | Difference (ppm) |
|---|---|---|
| 19.3 | 19.9 | +0.6 |
| 33.1 | 31.8 | -1.3 |
| 39.2 | 37.2 | -2.0 |
| 43.6 | 43.7 | +0.1 |
| 113.2 | 113.4 | +0.2 |
| 122.9 | 125.9 | +3.0 |
| 128.8 | 128.0 | -0.8 |
| 134.9 | 135.5 | +0.6 |
| 141.6 | 141.6 | 0 |
| 142.6 | 143.5 | +0.9 |
| 145.3 | 143.5 | -1.8 |
| 195.4 | 195.3 | -0.1 |
| 196.6 | 195.3 | -1.3 |

SYNERGISTIC HERBICIDAL COMPOSITION AND USE THEREOF

BACKGROUND

1. Field

The present disclosure relates to a synergistic herbicidal composition. The composition finds use in controlling the growth of undesirable plant, particularly in crops, including using the aforementioned composition.

2. Description of Related Art

The protection of crops from undesirable plant, which inhibits crop growth, is a constantly recurring problem in agriculture. To solve this problem, researchers are trying to produce an extensive variety of chemicals and chemical formulations effective in the control of such undesirable growth. Chemical herbicides of many types have been disclosed in the literature and a large number are in commercial use.

Some herbicidal active ingredients have been shown to be more effective when applied in combination rather than applied individually, this effect being referred to as "synergism." According to *Herbicide Handbook* of the Weed Science Society of America, Seventh Edition, 1994, page 318, "synergism" is an interaction of two or more factors such that the effect when combined is greater than the predicted effect based on the response to each factor applied separately.

The compound 2-(4-mesyl-2-nitrobenzoyl)cyclohexane-1,3-dione has the common name "mesotrione". Mesotrione is a substance that can form polymorph crystals. Two different forms, crystalline modifications I and II, of mesotrione are described in WO2006021743, which is incorporated herein by reference for all purposes. Mesotrione is active as a herbicide and is now commercially available in a range of formulations for controlling the growth of undesirable plant.

Metsulfuron-methyl, i.e., methyl 2-[[[[(4-methoxy-6-methyl-1,3,5-triazin-2-yl)amino]carbonyl]amino]sulfonyl]benzoate is a member of the sulfonylurea group of chemicals and used as herbicide. Metsulfuron-methyl is a residual sulfonylurea herbicide against broadleaved weed and is one of the most important in its class for use in the cereals sector, where it competes against broad-spectrum commodity products. The commercially available metsulfuron-methyl, which is usually manufactured by the process described in EP 0318276, which is incorporated herein by reference, where it is present in an amorphous state having a melting point of about 158° C.

SUMMARY

Due to its viscosity, the amorphous state of metsulfuron-methyl has a poor spray equipment clean-out property and will heavily contaminate the spray equipment. We found that a crystal form of metsulfuron-methyl, termed "crystalline modification I", has an improved spray equipment clean-out property and reduces residual metsulfuron-methyl contamination of spray equipment. The crystalline modification I of metsulfuron-methyl of an embodiment of the invention exhibits at least 3 of the following reflexes as 2θ values in an X-ray powder diffractogram recorded using Cu—Kα radiation at 25° C.:

$2\theta = 6.28 \pm 0.2$ (1)

$2\theta = 12.61 \pm 0.2$ (2)

$2\theta = 13.50 \pm 0.2$ (3)

$2\theta = 16.59 \pm 0.2$ (4)

$2\theta = 17.66 \pm 0.2$ (5)

$2\theta = 19.70 \pm 0.2$ (6)

$2\theta = 21.63 \pm 0.2$ (7)

$2\theta = 21.84 \pm 0.2$ (8)

$2\theta = 23.22 \pm 0.2$ (9)

$2\theta = 24.21 \pm 0.2$ (10)

$2\theta = 27.25 \pm 0.2$ (11)

$2\theta = 27.98 \pm 0.2$ (12)

$2\theta = 29.25 \pm 0.2$ (13).

According to an embodiment of the invention, a crystalline modification I of metsulfuron-methyl is provided, exhibiting at least 3 of the following reflexes as 2θ values in an X-ray powder diffractogram recorded using Cu—Kα radiation at 25° C.:

$2\theta = 6.28 \pm 0.2$ (1)

$2\theta = 12.61 \pm 0.2$ (2)

$2\theta = 13.50 \pm 0.2$ (3)

$2\theta = 16.59 \pm 0.2$ (4)

$2\theta = 17.66 \pm 0.2$ (5)

$2\theta = 19.70 \pm 0.2$ (6)

$2\theta = 21.63 \pm 0.2$ (7)

$2\theta = 21.84 \pm 0.2$ (8)

$2\theta = 23.22 \pm 0.2$ (9)

$2\theta = 24.21 \pm 0.2$ (10)

$2\theta = 27.25 \pm 0.2$ (11)

$2\theta = 27.98 \pm 0.2$ (12)

$2\theta = 29.25 \pm 0.2$ (13).

More particularly, the crystalline modification I of metsulfuron-methyl of the invention is characterized by an X-ray powder diffractogram having at least three of the reflexes indicated above. Preferably, the crystalline modification I is one having at least four of the aforementioned reflexes, more preferably at least five, six, seven, or eight of said reflexes. An X-ray powder diffractogram of an embodiment of the crystalline modification I of metsulfuron-methyl is shown in FIG. 2, which will be described in detail hereinafter.

According to a preferred embodiment, the crystalline modification I exhibits at least 3, 4, or 5, or all of the reflexes from the following:

$2\theta = 6.28 \pm 0.2$ (1)

$2\theta = 12.61 \pm 0.2$ (2)

$2\theta = 16.59 \pm 0.2$ (4)

2θ=23.22±0.2 (9)

2θ=24.21±0.2 (10)

2θ=27.25±0.2 (11).

It has been have surprisingly found that combining the crystalline modification I of mesotrione with the crystalline modification I of metsulfuron-methyl provides a composition having a synergistic activity, that is, an increased herbicidal activity, compared with the activity expected from the activity of the two components when applied individually.

Accordingly, in a first aspect, the invention provides a herbicidal composition comprising:

(A) the crystalline modification I of 2-(4-mesyl-2-nitrobenzoyl)cyclohexane-1,3-dione (mesotrione); and (B) the crystalline modification I of methyl 2-[[[[(4-methoxy-6-methyl-1,3,5-triazin-2-yl)amino]carbonyl]amino]sulfonyl]benzoate (metsulfuron-methyl).

The composition of an embodiment of the invention is of particular use for controlling the growth of undesirable plant.

In a second aspect, the invention provides a method of controlling the growth of undesirable plant comprising applying to the plant or to the locus thereof a herbicidally effective amount of the herbicidal composition of the first aspect of the invention.

In a further aspect, the invention provides the use of the herbicidal composition of the first aspect of the invention in control of undesirable plant growth at a locus.

BRIEF DESCRIPTION OF DRAWINGS

Various aspects of the invention can be more clearly understood by reference to the drawings, which are described below, and are intended to be illustrative, not limiting, of the invention.

DETAILED DESCRIPTION OF SPECIFIC EMBODIMENTS

The references to the crystalline modifications I and II of mesotrione as used herein, refer to the crystalline modification of mesotrione disclosed in WO2006021743, where they are described as Form I and Form II, respectively.

As discussed in WO2006021743, crystallization of mesotrione is carried out by a pH shift in a predominantly aqueous solution whereby the soluble salt is converted to the insoluble free acid resulting in high yield. Mesotrione exists in two polymorphic forms: the thermodynamically stable form, known as Form 1, and the metastable form, known as Form 2.

Figure 1:
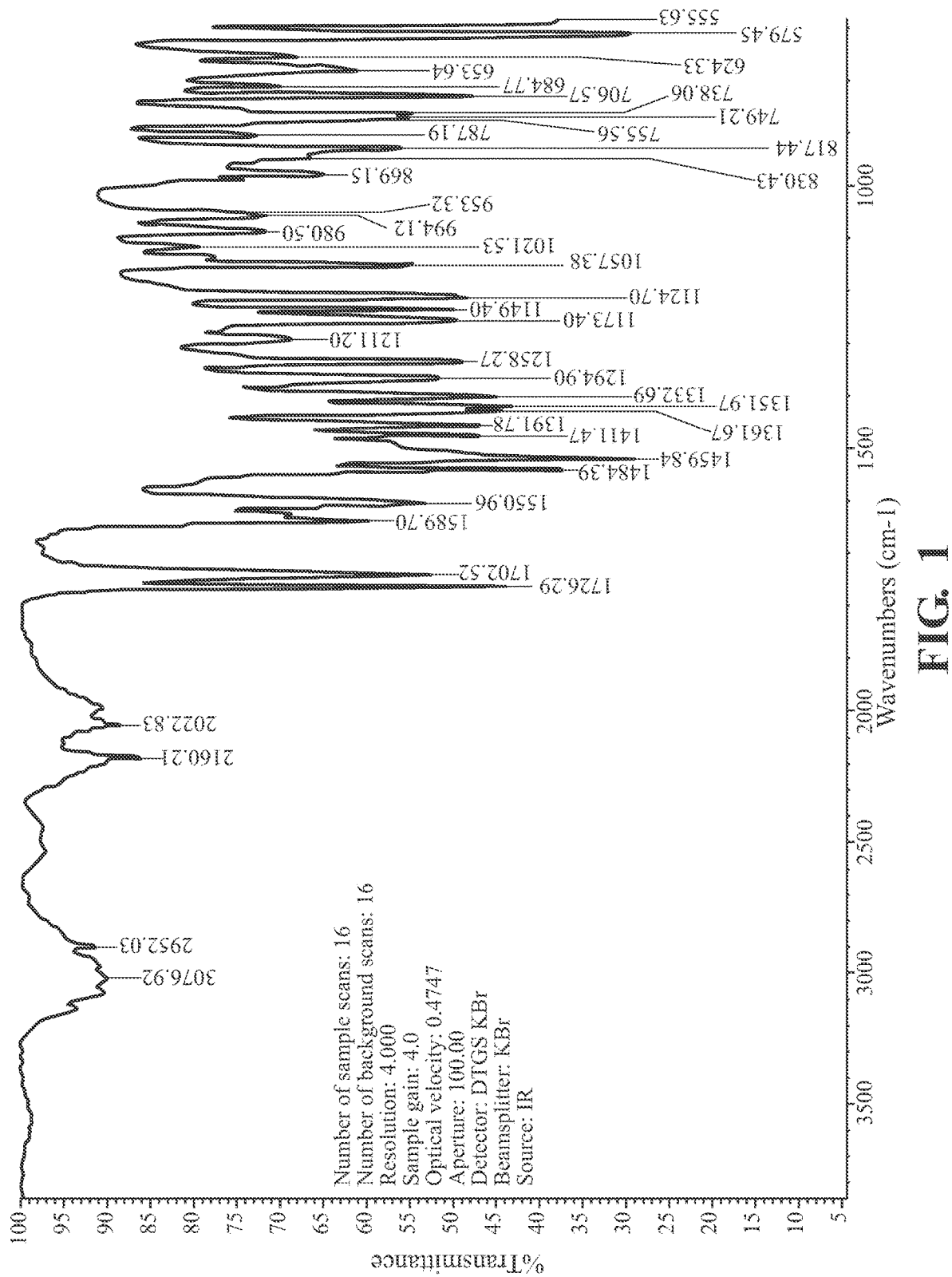
FIG. 1 is a graph showing the results of an infrared (IR) spectrograph of crystalline modification I of metsulfuron-methyl, according to an embodiment of the invention.
Figure 3:
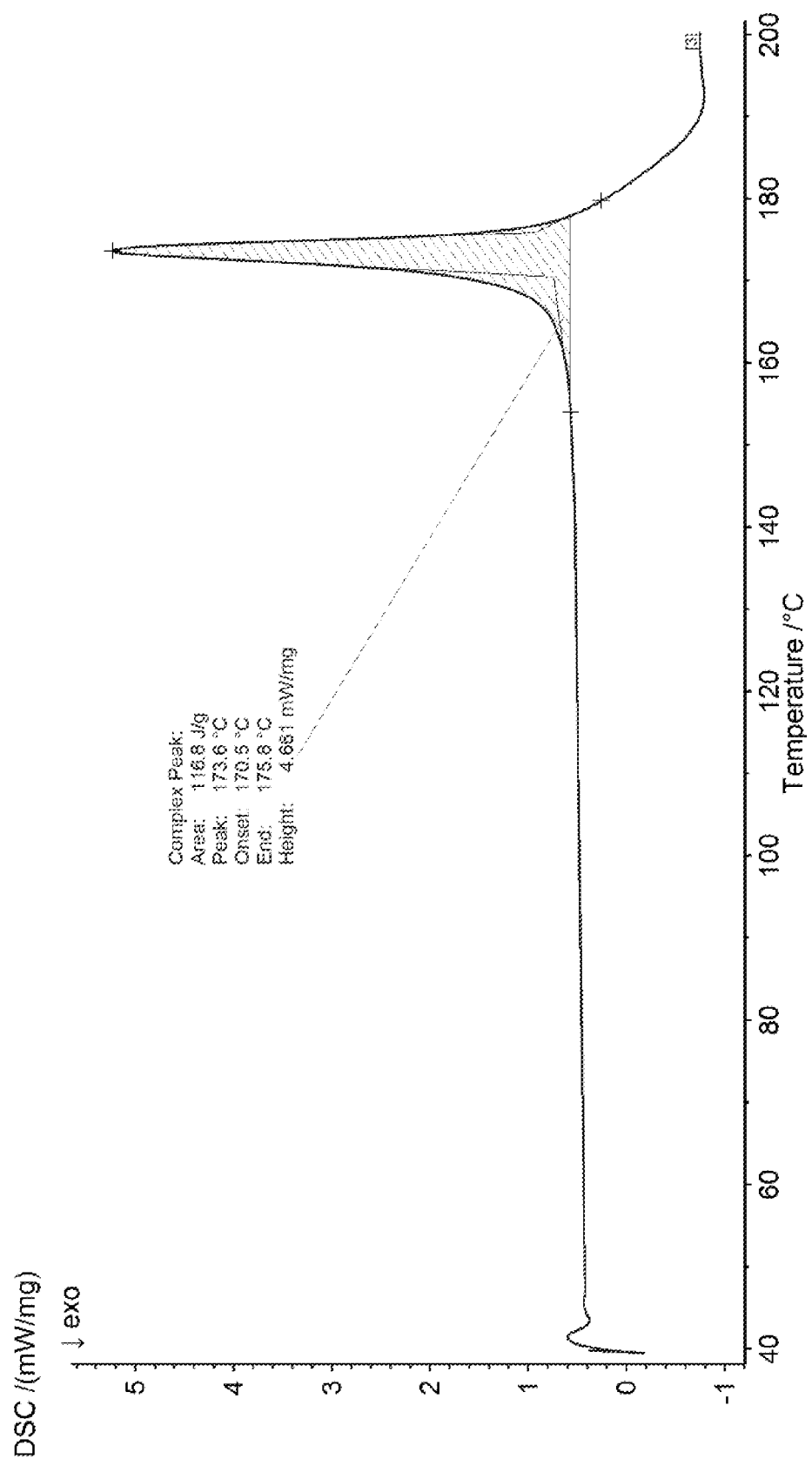
FIG. 3 is a Differential Scanning calorimetry (DSC) thermogram of crystal modification I of metsulfuron-methyl, according to an embodiment of the invention.

WO2006021743 also discloses that for aqueous crystallizations, a large difference in size between Form 1 and Form 2 was seen, and this is a very useful technique for assessing the presence of Form 2. The powder XRD patterns and data for the two polymorphic forms are also distinctly different and are shown in FIGS. 1(5A, 5B.) and 2(6A, 6B). FIG. 3(7) compares the infra-red patterns of the two polymorphic forms clearly showing distinctive differences in the pattern and hence crystal structure. Furthermore, the two polymorphs give significant differences in their solid state $^{13}$C nmr measurements, FIGS. 4A, 4B and 4C (8A-8C). FIGS. 5-8C were obtained from WO2006021743.

Due to the size of the crystals of Form 1, milling is required to reduce the crystal size when formulating into an agrochemically acceptable composition. Form 2 is already of a size that would be suitable for formulating into an agrochemically acceptable composition. However, Form 2 is thermodynamically unstable and would gradually convert to Form 1, consequently any formulation prepared therefrom would be unstable and would aggregate and settle. WO2006021743 discloses that a further problem exists in that Form 1 is currently the form used in preparing agrochemically acceptable formulation, but during the manufacturing process. Form 2 is readily made when mesotrione is recrystallized in aqueous solution. Due to Form 2 being very fine, it is difficult to filter and production time is lost while trying to remove it from the system. If the Form 2 material obtained during recrystallization cannot be converted to Form 1, then it must be disposed of, resulting in lost revenue and inefficient production processes.

WO2006021743 further discloses a process for selectively controlling which polymorph is obtained and is stable. WO2006021743 also discloses a process for readily converting Form 2 polymorph into Form 1 polymorph. The process described in WO2006021743 provides for selectively controlling the crystallizations of thermodynamically stable Form 1 or kinetically stable Form 2 polymorphs of mesotrione from an aqueous mesotrione solution. The method comprises adjusting the pH of the mesotrione solution to a value wherein the thermodynamically stable Form 1 or kinetically stable Form 2 mesotrione is ultimately obtained. Suitably, the pH of the mesotrione solution is first increased to a pH of >7, suitably MO, and preferably >12. The pH can be increased by the addition of a suitable base, for example NaOH, pyridine, triethylamine, Mg(OH)$_2$, NH$_4$OH etc. The addition of the base results in a salt of mesotrione being formed which has a high solubility, ensuring that mesotrione is fully solubilized and that no mesotrione remains out of solution.

In one embodiment of WO2006021743, the pH is adjusted to <3.0, resulting in the thermodynamically stable Form 1 mesotrione being obtained. Suitably, the pH is adjusted to pH <2.5, and preferably to pH 2±0.5. In a second embodiment of WO2006021743, the pH is adjusted to greater than 3.0 resulting in the kinetically stable Form 2 mesotrione being obtained. Suitably, the pH is adjusted to a value between about greater than 3.0 and about 5.5, preferably between 3.5 and 5.5. The upper value of pH is dependent on which particular mesotrione salt is in solution. The adjustment in pH is suitably carried out by the addition of acid to the mesotrione solution. Suitably, the acid is selected from the group consisting of HCl, $H_2SO_4$, $HNO_3$ etc: preferably HCl. In some cases it may be beneficial to add some Form 1 seed crystals to the solution after reducing the pH in order to assist crystallization of Form 1. In certain cases, for example at a pH of 3.0 or slightly below, an increase in temperature can aid crystallization of Form 1. Furthermore, the presence of salt and/or solvent can aid crystallizations of Form 1. Suitably, the process is carried out at a temperature of ≥25° C., preferably ≥40° C.

WO2006021743 also discloses a process for converting Form 2 mesotrione to Form 1 mesotrione. The process comprises reducing the pH of a Form 2 mesotrione suspension to a pH of <3.0. Suitably, the pH is adjusted to pH <2.5, and preferably to pH 2±0.5. In one embodiment, the Form 2 mesotrione has previously been isolated and is resuspended in an appropriate solvent, for example water. In a second embodiment, the Form 2 mesotrione has been formed as a result of the manufacturing process, and has not been isolated; it is therefore already suspended in the mother liquor.

Suitably, the pH of the Form 2 mesotrione suspension is first increased to a pH of >7, suitably d0, and preferably >12. The pH can be increased by the addition of a suitable base, for example NaOH, etc. The addition of the base results in a salt of mesotrione being formed, which has a high solubility, resulting in the Form 2 mesotrione going into solution. The reduction in pH is suitably carried out by the addition of acid to the mesotrione suspension. Suitably, the acid is selected from the group consisting of HCl, $H_2SO_4$, $HNO_3$ etc; preferably HCl.

In some cases it may be beneficial to add some Form 1 seed crystals to the Form 2 mesotrione suspension after reducing the pH in order to assist crystallization of Form 1. In certain cases, for example at a pH of 3.0 or slightly below, an increase in temperature can aid crystallisation of Form 1. Furthermore, the presence of salt and/or solvent can aid crystallization of Form 1. Suitably, the process is carried out at a temperature of >25° C., preferably >40° C.

WO2006021743 further discloses the use of pH to control the crystallizations of polymorphs of mesotrione. WO2006021743 also discloses a way to provide a polymorph of mesotrione, wherein the polymorph is characterized by a powder X Ray diffraction pattern and data as given in FIGS. 2(6) and C13 nmr data as given in FIGS. 4B and 4C (8A and 8C), which were obtained from WO2006021743.

WO2006021743 also discloses several examples. Example 1 is an example of the conversion of already isolated Form 2 mesotrione to Form 1 mesotrione in the presence of solvent. A 10% solution of Form 2 in water was made at different pH values ranging from 2 to 6. If seeded, a seed concentration of 2% Form 1 relative to the Form 2 mesotrione concentration was used. A 1:5 ratio of xylene to mesotrione was used in these experiments. Samples were analyzed for polymorph form after the time shown in table. Actual conversion time may be less than shown. The results are shown in Table 1 of WO2006021743, which is copied below.

TABLE 1

| Example No. | Temp (° C.) | Time (hr) | pH | Seed | Dominant Polymorph Form (IR) |
|---|---|---|---|---|---|
| 1A | 21 | 6.3 | 2.0 | yes | 1 |
| 1B | 21 | 6.3 | 2.9 | yes | 2 |
| 1C | 21 | 6.3 | 4.1 | yes | 2 |
| 1D | 21 | 6.3 | 5.9 | yes | 2 |
| 1E | 21 | 6.3 | 2.5 | yes | 1 |
| 1F | 21 | 6.3 | 5.1 | yes | 2 |
| 1G | 21 | 23.3 | 2.0 | yes | 1 |
| 1H | 21 | 23.3 | 2.9 | yes | 2 |
| 1I | 21 | 23.5 | 5.9 | yes | 2 |
| 1J | 21 | 23.5 | 2.5 | yes | 1 |
| 1K | 21 | 23.5 | 2.0 | no | 1 |
| 1L | 21 | 22.0 | 2.0 | no | 1 |
| 1M | 21 | 22.0 | 4.0 | no | 2 |

Example 2 of WO2006021743 is an example of converting in process Form 2 mesotrione to Form 1 mesotrione. Form 2 material was made in the plant via a process upset. Samples of the Form 2 slurry from the crystallizer were taken to the lab where the pH of the solution was adjusted to 2.0 and the material was heated to 40-50 C while agitated. The results are shown in Table 2 of WO2006021743, which is copied below.

TABLE 2

| Example No. | 2A | 2B | 2C | 2D | 2E |
|---|---|---|---|---|---|
| Temp of conversion | 20° C. | 40° C. | 50° C. | 50° C. | 40° C. |
| Hours to convert | Did not convert after 4-5 days | 4 | 1.4 | 1.8 | 4 |
| pH of conversion | 3.2 | 2.0 | 2.0 | 2.9 | 2.0 |
| Agitated | no | yes | yes | yes | yes |
| Seeded | no | no | no | no | no |

Example 3 of WO2006021743 is an example of converting already isolated Form 2 mesotrione to Form 1 mesotrione by placing the Form 2 material in process filtrate, adding different amounts of TEA and NaCl, adjusting the pH to 2.0, and heating the material to 40-50 C. The results are shown in Table 3 of WO2006021743, which is copied below.

TABLE 3

| Example No. | 3A | 3B | 3C | 3D |
|---|---|---|---|---|
| Temp of conversion | 40 | 50 | 50 | 50 |
| Hours to convert | 17 | 1 | 5 | 4 |
| pH of conversion | 1.8 | 2.0 | 2.0 | 1.8 |
| Ratio meso:TEA | | 1:1.3 | 1:1.3 | 1:1.3 |
| Ratio meso:NaCl | | 2:1 | 2:1 | 2:1 |
| Agitated | yes | yes | yes | yes |
| Seeded | no | no | no | no |

Example 4 of WO2006021743 is an example of converting already isolated Form 2 mesotrione to Form 1 mesotrione by placing the Form 2 material in process filtrate, adjusting the pH to 2.0, and heating the material to 40-50 C. Table 4 of WO2006021743 is copied below.

TABLE 4

| | Example No. | | | | | |
|---|---|---|---|---|---|---|
| | 4A | 4B | 4C | 4D | 4E | 4F |
| Temp of conversion | 22 | 22 | 30 | 50 | 50 | 50 |
| Hours to convert | Did not convert after 52 hrs | Did not convert after 48 hrs | Did not convert after 18 hrs | 2 | 2 | 2 |
| pH of conversion | 3.6 | 3.6 | 3.6 | 2.0 | 1.8 | 1.8 |
| Agitated | yes | yes | yes | yes | yes | no |
| Seeded | yes | yes | yes | no | no | no |

Example 5 of WO2006021743 includes the isolation of mesotrione from a crude enolate solution. Plant mesotrione enolate suspension was filtered to remove any excess solid enolate. 50 ml of the filtered solution was placed in a reaction flask and heated to 400 C. A pH probe was placed in the vessel to monitor the pH and the pH was reduced by adding 10% hydrochloric acid in a controlled manner over 20 minutes (the addition can also be done over 5 minutes and Form 1 is still isolated) to 2.8. The crystals were allowed to stir for 20 minutes before being isolated by filtration under reduced pressure, washed with water and sucked dry on the filter. The polymorphic form of the product was confirmed by FT-IR and PXRD as Mesotrione Form 1.

Example 6 of WO2006021743 includes the isolation of mesotrione from a laboratory prepared enolate solution. The filtrates were placed in a reaction flask, stirred and crystals of Mesotrione added. The pH of the slurry was measured and increased to 10.5 by the addition of 48% sodium hydroxide. The slurry was stirred for 60 minutes and the excess crystals were removed by filtration. 20 ml of the enolate solution was placed in a reaction flask stirred and heated to 40° C. A pH probe was place in the solution and the pH was reduced to 2.6 by the controlled addition of 10% hydrochloric acid over 20 minutes. The resulting crystals were stirred for a further 60 minutes before being collected by filtration under reduced pressure, washed with water and sucked dry on the filter. The polymorphic form of the crystals was determined as form 1 by FT-IR and PXRD.

Example 7 of WO2006021743 illustrates polymorphic stability of pure mesotrione. In this example, 1.6 g of the re-crystallized mesotrione crystals were stirred with water (30 ml) in a reaction flask and the pH increased to 12 by the addition of sodium hydroxide. 1.5 ml of 10% hydrochloric acid was added over 15 minutes to reduce the pH of the solution to pH ranges between 1 and 4. The suspension was stirred and the polymorphic form of the crystals was determined as Form 2 by optical microscopy and FT-IR. Below pH 2.5, Form 2 transformed to Form 1 within 1 hour. At pH 3 Form 2 was stable but converted to Form 1 when seeded with Form 1 over four hours. At pHs between 3.5 and 4 the suspension could be heated to 400 C and 1% by weight of Form 1 seeds added and the Form 2 crystals would not transform to Form 1. Periodically over the next 3 weeks the polymorphic form of the suspension was determined and was always found to be Form 2. After 3 weeks the monitoring ceased on a regular basis, samples taken several months later still showed that the crystals had not transformed to Form 1.

Example 8 of WO2006021743 includes stabilizing Form 2 mesotrione in a 0.05% Rhodasurf DA630 Solution. In this example, 0.5 g of Form 2 mesotrione crystals were stirred with a 0.05% Rhodasurf D A630 t (15 ml) in a reaction flask. A pH probe was placed in the system and the pH was increased to 11.5 by the addition of 0.6 ml of 10% sodium hydroxide solution. The pH of the solution was reduced to 5.5 by the addition of 0.74 g of Form 2 mesotrione. The polymorphic form of the mesotrione was monitored periodically by microscopy and FT-PR. After 10 days the mesotrione was still predominately Form 2; Form 1 had nucleated but had not grown.

The term "herbicide" as used herein, refers to a compound that controls the growth of plants.

The term "herbicidally effective amount" as used herein, refers to the quantity of such a compound or combination of such compounds that is capable of producing a controlling effect on the growth of plants. The controlling effects include all deviation from the natural development of the target plants, for example killing, retardation of one or more aspects of the development and growth of the plant, leaf burn, albinism, dwarfing and the like.

The term "plants" refers to all physical parts of a plant, including shoots, leaves, needles, stalks, stems, fruit bodies, fruits, seeds, roots, tubers and rhizomes.

The term "locus" refers to the place on which the plants are growing, the place on which the plant propagation materials of the plants are sown or the place on which the plant propagation materials of the plants will be sown.

"At least one" designates a number of the respective compounds or components of 1, 2, 3, 4, 5, 6, 7, 8, 9 or more, preferably 1, 2, or 3.

The synergistic herbicidal composition, the method and use of embodiments of the invention are suitable for controlling undesirable plant growth in a range of crops, including: cereals, for example wheat, barley, rye, oats, corn, rice, sorghum, triticale and related crops; fruit, such as pome fruit, stone fruit and soft fruit, such as apples, pears, plums, peaches, pistachio, almonds, cherries, and berries, for example grape, banana, strawberries, bushberry, caneberry, raspberries and blackberries; leguminous plants, for example beans, lentils, peas, and soybeans; oil plants, for example oilseed rape, mustard and sunflowers; cucurbitaceae, for example cantaloupe, marrows, cucumbers, melons, pumpkin, squash and watermelon; citrus fruit, such as oranges, lemons, grapefruit and mandarins; and vegetables, for example spinach, lettuce, asparagus, cabbages, carrots, onions, tomatoes, potatoes, paprika, garlic and leeks; coffee; sugarcane; hops; tree nuts; as well as ornamentals, for example flowers, such as roses, shrubs, broad-leaved trees and evergreens, such as conifers. Preferably, the composition described herein is used to treat cereals, sugarcane, vegetables and oil plants. More preferably, wheat, barley, rye, oats, corn, triticale, sugarcane, vegetables and oilseed rape.

The control of undesirable plant growth in such crops may be achieved by applying to the locus (A) the crystalline modification I of 2-(4-mesyl-2-nitrobenzoyl)cyclohexane-1, 3-dione (mesotrione), which is identified as Form I in WO 2006/021743 and (B) the crystalline modification I of methyl 2-[[[[(4-methoxy-6-methyl-1,3,5-triazin-2-yl)amino]carbonyl]amino]sulfonyl]benzoate (metsulfuron-methyl) in suitable amounts.

The active compounds (A) and (B) may be applied to the locus together or separately. If applied separately, active compounds (A) and (B) may be applied at the same time and/or consecutively. The control may comprise applying to the undesirable plant or the locus thereof a herbicidally effective amount of the herbicidal composition.

It has been surprisingly found that a combination of (A) the crystalline modification I of 2-(4-mesyl-2-nitrobenzoyl) cyclohexane-1,3-dione (mesotrione) and (B) the crystalline modification I of methyl 2-[[[[(4-methoxy-6-methyl-1,3,5- triazin-2-yl)amino]carbonyl]amino]sulfonyl]benzoate (metsulfuron-methyl) exhibits a synergistic action in the control of many weeds, particularly, but not limit to, broadleaved weeds and grasses. For example, weeds treatable according to an embodiment of the invention include:

African Rue (*Peganum Harmala*), Alkali Mallow (*Malvella leprosa*), Alligatorweed (*Alternantha philoxeroides*), Alsike Clover (*Trifolium hybridum*), Amaranth (*Amaranthus* spp), Annual Broomweed (*Gutierrezia dracunculoides*), annual knawel, annual mercury (*Mercurialis annua*), Annual Pricklepoppy (*Argemone polyanthemos*), Annual Sowthistle (*Sonchus oleraceus*), Antelope Horn (*Asclepias viridis*), Asiatic Hawksbeard (*Youngia japonica*), Balsam Gourd (*Ibervillea lindheimeri*), Balsam-Apple (*Momordica charantia*), Bastard Toadflax (*Comandra umbellata*), Beggarweed (*Desmodium* spp.), Bindweed, Field (noxious) (*Convolvulus arvensis*), Bindweed, Hedge (*Convolvulus sepium*), Bindweed, Texas (*Convolvulus equitans*), Birdsfoot Trefoil (*Lotus corniculatus*), Bittercress, Smallflowered (*Cardamine parviflora*), Bitterweed (*Hymenoxys odorata*), Bitterweed, Brown (*Helenium badium*), Black Medic (*Medicago lupulina*), black mustard, Black Nightshade (*Solanum americanum*), Blackfoot Daisy (*Melampodium leucanthum*), Blackseed Plantain (*Plantago rugelii*), Bladderpod (*Lesquerella gracilis*), blue/purple mustard, Bracted Plantain (*Plantago aristata*), broadleaf dock, Broadleaf Plantains (*Plantago* spp.), Buckhorn Plantain (*Plantago lanceolata*), Buffalo Gourd (*Cucurbita foetidissima*), Buffalobur (*Solanum rostratum*), Bulbous Buttercup (*Ranunculus bulbosus*), Bull Thistle (*Cirsium vulgare*), bur buttercup, Bur Clover (*Medicago hispida*), Burcucumber (*Sicyos angulatus*), Bushy Buttonweed (*Spermacoce assurgens*), Bushy Wallflower (*Erysimum repandum*), bushy wallflower, Butterweed (*Senecio glabellus*), Camphorweed (*Heterotheca subaxillaris*), Canada Thistle (*Cirsium arvense*), Carolina False Dandelion (*Pyrrhopappus carolinianus*), Carolina *geranium*, Carpetweed (*Mollugo verticillata*), Catchweed Bedstraw (*Galium aparine*), Centella, Chamberbitter (*Phyllanthus urinaria*), Chicory (*Cichorium intybus*), Cinquefoil, Clammy Groundcherry (*Physalis heterophylla*), clasping pepperwee, Climbing Hempweed (*Mikania scandens*), coast fiddleneck, Coat Buttons (*Tridax procumbens*), Common Beggar-tick (*Bidens alba*), common buckwheat, Common Burdock (*Arctium minus*), Common Chickweed (*Stellaria media*), Common Cocklebur (*Xanthium strumarium*), Common Groundsel (*Senecio vulgaris*), Common Lambsquarters (*Chenopodium album*), Common Mallow, Common Milkweed (*Asclepias syriaca*), Common Mullein (*Verbascum thapsus*), common orache (*Atriplex patula*), Common Pokeweed (*Phytolacca americana*), Common Purslane (*Portulaca oleracea*), common radish, Common Ragweed (*Ambrosia artemiisifolia*), Common Sneezeweed (*Helenium amarum*), Common Sunflower (*Helianthus annuus*), Common Waterhemp (*Amaranthus rudis*), Common Yarrow (*Achillea millefolium*), Compass Plant (*Silphium laciniatum*), conical catchfly, *Coreopsis* (*Coreopsis tinctoria*), corn chamomile, Corn Gromwell (*Lithospermum arvense*), Corn Speedwell (*Veronica arvensis*), corn spurry, Cowcockle (*Vaccaria pyramidata*), Cowpen Daisy (*Verbesina encelioides*), Creeping Beggarweed (*Desmodium incanum*), creeping buttercup (*Ranunculus repens*), Creeping Cucumber (*Melothria pendula*), Creeping Indigo (*Indigofera spicata*), Creeping *Oxalis*, Creeping Speedwell, Creeping Woodsorrel (*Oxalis corniculata*), cress, *Croton*, Texas (*Croton texensis*), *Croton*, Tropic (*Croton glandulosus*), *Croton*, Woolly (*Croton capitatus*), Cup Plant (*Silphium perfoliatum*), Cupid's Shaving Brush (*Emilia sonchifolia*), Curly Dock (*Rumex crispus*), Curlycup Gumweed (*Grindelia squarrosa*), Cutleaf Eveningprimose (*Oenothera laciniata*), Cutleaf Groundcherry (*Physalis angulata*), Daisy Fleabane (*Erigeron annuus*), Dakota *Verbena* (*Verbena bipinnatifida*), Dandelion (*Taraxacum officinale*), Dayflower (*Commelina*), Deadnettle, Purple (*Lamium purpureum*), Devil's Claw (*Proboscidea louisianica*), Dichondra, Dogfennel (*Euphorbia capillifolium*), Elderberry (*Sambucus canadensis*), Englemann Daisy (*Englemannia pinnatifida*), false chamomile, False Daisy or Eclipta (*Eclipta prostrata*), False Nightshade (*Chamaesaracha coronopus*), field chickweed, Field Dodder (*Cuscuta campestris*), field pennycress, Filaree, California or Redstem (*Erodium cicutarium*), Filaree, Texas or Storkbill (*Erodium texanum*), fixweed, Flixweed (*Descurainia sophia*), Florida Pellitory (*Parietaria floridana*), Garden Rocket (*Eruca vesicaria* ssp. *sativa*), Garden Spurge (*Chamaesyce hirta*), Germander (*Teucrium cubense*), Giant Ragweed (*Ambrosia trifida*), Goldenrod (*Solidago* spp.), goosefoots (*Chenopodium* spp.), Gray Tidestrom (*Tidestromia lanuginosa*), great ragweed (*Ambrosia trifida*), Greenbriar (*Smilax* spp.), Greenthread (*Thelesperma filifolium*), Ground Spurge (*Euphorbia prostrata*), groundsel, Hairy Caltrop (*Kallstroemia hirsutissina*), Hairy Nightshade (*Solanum sarrachoides*), Hedge Parsley (*Torilis arvensis*), Hemp Dogbane (*Apocynum cannabinum*), Hemp Sesbania (*Sesbania exaltata*), Henbit (*Lamium amplexicaule*), Hogpotato (*Hoffmanseggia densiflora*), Honeysuckle (*Lonicera* spp.), Hophornbeam Copperleaf (*Acalypha ostryaefolia*), Horehound (*Marrubium vulgare*), Horse purslane (*Trianthema portulacastrum*), Horsenettle (*Solanum carolinense*), Horseweed (*Conyza canadensis*), Huisachedaisy (*Amblyolepis setigera*), Hyssop Spurge (*Chamaesyce hyssopifolia*), Illinois Bundleflower (*Desmanthus illinoensis*), Indian Blanket (*Gaillardia pulchella*), Indian Mallow (*Abutilon incana*), Japanese Hops (*Humulus japonicus*), Jerusalem Artichoke (*Helianthus tuberosus*), Jimsonweed (*Datura stramonium*), Khakiweed (*Alternanthera pungens*), knotweed (*polygonum* spp.), *Kochia* (*Kochia scoparia*), Kudzu (noxious) (*Pueraria lobata*), Lamb's-quarters (*Chenopodium album*), Lanceleaf Sage (*Salvania reflexa*), Lantana (*Lantana camara*), Livid Amaranth (*Amaranthus blitum*), Lizardtail Gaura (*Gaura Parviflora*), London rocket, Long Fruited Primrose-Willow (*Ludwigia octovalvis*), Marijuana (noxious) (*Cannabis sativa*), Marsh Parsley (*Cyclospermum leptophylum*), marshelder, Match-Head (*Phyla nodiflora*), mayweed chamomile, Mexicanhat (*Ratibida columnaris*), Mexican-Poppy (*Argemone mexicana*), miners lettuce, Mock Bishop's Weed (*Ptilimnium capillaceum*), Morningglory, Bigroot (*Ipomoea pandurata*), Morningglory, Ivyleaf (*Ipomoea hederacea*), Morningglory, Pitted (*Ipomoea lacunosa*), Morningglory, Sharppod (*Ipomoea trichocarpa*), Morningglory, Tall (*Ipomoea purpurea*), Mouseear Chickweed (*Cerastium vulgatum*), Mousetail (*Myosurus minimus*), *Multiflora* rose (noxious) (*Rosa multiflora*), Mustard, London Rocket (*Sisymbrium irio*), Mustard, Pinnatetansy (*Descurainia pinnate*), Mustard, Tansy (*Descurainia pinnata*), Mustard, Tumble (*Sisymbrium altissimum*), Mustard, Turnip Weed (*Rapistrum rugosum*), Mustard, Wild (*Brassica kaber*), narrowleaf lambsquarters, ightflowering catchfly, Nodding Spurge (*Euphorbia nutans*), Orange Globe Mallow (*Sphaeralcea occidentalis*), Oxeye Daisy (*Chrysanthemum leucanthemum*), Palmer Amaranth (*Amaranthus palmeri*), Partridgepea (*Cassia chamaecrista*), Pennsylvania smartweed, Pennycress, Field (*Thlaspi arvense*), pigweed, Pigweed, Prostrate (*Amaranthus blitoides*), Pigweed, Redroot (*Amaranthus retroflexus*), Pigweed, Tumble (*Amaranthus albus*), pineappleweed, plains coreopsis, Poison Hemlock (*Conium maculatum*), prickly lettuce, Prickly Pear (*Opuntia* spp.), Prickly *Sida* (*Sida spinosa*), Prostrate Knotweed (*Polygonum aviculare*), Puncturevine (*Tribulus terrestris*), Purple Flower Groundcherry (*Physalis lobata*), Purple Horsemint (*Monarda citriodora*), Purple Loosestrife (noxious) (*Lythrum salicaria*), Purslane Speedwell (*Veronica peregrina*), Rain Lily (*Cooperia drummondii*), Rattlesnake master (*Eryngium yuccifolium*), Red Hornedpoppy (*Glaucium corniculatum*), redmaids, redroot pigweed (*Amaranthus retroflexus*), Riddell Groundsel (*Senecio riddellii*), Rosinweed (*Silphium integrifolium*), rough cocklebur (*Xanthium strumarium*), Russian thistle, Saltmarsh Fleabane (*Pluchea odorata*), Santa Maria or *Parthenium* Pancake Weed (*Parthenium hysterophorus*), Sawtooth aster (*Prionopsis ciliata*), Scarlet Gaura (*Gaura coccinea*), Scarlet Musk Flower (*Nyctaginia capitata*), scentless chamomile, Scrambledeggs (*Corydalis curvisiliqua*), Shepherd's Purse (*Capsella bursa-pastoris*), Sicklepod (*Senna obtusifolia*), SilverLeaf *Cassia* (*Cassia phyllodinea*), Silverleaf Nightshade (*Solanum elaeagnifolium*), Silversage (*Artemesia ludoviciana*), Silversheath Knotweed (*Polygonum argyrocoleon*), Skeletonweed (*Lygodesmia juncea*), Slender Aster (*Aster gracilis*), smallflower buttercup, Smallhead Sneezeweed (*Helenium microcephalum*), Smallseed Falseflax (*Camelina microcarpa*), smartweed, Smartweed, Pale (*Polygonum lapathifolium*), Smartweed, Pennsylvania (*Polygonum pensylvanicum*), Smooth Groundcherry (*Physalis subglabrata*), Smooth Sumac (*Rhus glabra*), snow speedweed, Snow-on-the-mountain (*Euphorbia marginata*), Southern *Sida* (*Sida acuta*), Spiny Pigweed (*Amaranthus spinosus*), Spiny Sowthistle (*Sonchus asper*), Sprawling Horseweed (*Calyptocarpus vialis*), Spreading Dayflower (*Commelina diffusa*), Spurge, Leafy (*Euphorbia esula*), Spurge, Prostrate (*Euphorbia humistrata*), Spurge, Toothed (*Euphorbia dentata*), Spurred *Anoda* (*Anoda cristata*), sticky chickweed, stinking mayweed/dogfennel, Sweet-potato (*Ipomea batatas*), swinecress, Tahoka Daisy (*Machaeranthera tanacetifolia*), tansymustard, tarweed fiddleneck, Texas Blueweed (*Helianthus ciliaris*), Texas Bullnettle (*Cnidoscolus texanus*), Thistle, Blessed Milk (*Silybum marianum*), Thistle, Distaff (*Carthamus lanatus*), Thistle, Malta Star (*Centaurea melitensis*), Thistle, Musk (noxious) (*Carduus nutans*), Thistle, Scotch (noxious) (*Onopordum acanthium*), Thistle, Tall (*Cirsium altissimum*), Thistle, Texas Purple (*Cirsium texanum*), Threadleaf Groundsel (*Senecio longilobus*), Toothcup (*Ammannia latifolia*), Trumpetcreeper (*Campsis radicans*), tumble, Twinleaf Sennia (*Senna roemeriana*), Velvetleaf (*Abutilon theophrasti*), Venice Mallow (*Hibiscus trionum*), Vetch (*Vicia* spp.), Virginia Copperleaf (*Acalypha virginica*), Virginia Creeper (*Parthenocissus quinquefolia*), Virginia Pepperweed (*Lepidium virginicum*), volunteer adzuki bean (*Vigna angularis*), volunteer lentils, volunteer peas, volunteer sunflower, Wandering Cudweed (*Gnaphalium pensylvanicum*), Waterhemlock (*Cicuta maculata*), Waterhemp (*Amaranthus tuberculatus*), Waterleaf (*Nama hispidum*), waterpod, Western Ragweed (*Ambrosia psilostachya*), Western Salsify (*Tragopogon dubuis*), White Foxglove Beardtongue (*Penstemon digitalis*), White Heath Aster (*Aster pilosus*), White Snakeroot (*Eupatorium rugosum*), Wild Buckwheat (*Polygonum convolvulus*), Wild Carrot (*Daucus carota*), wild chamomile, wild garlic, Wild *Geranium* (*Geranium carolinanum*), Wild Lettuce (*Lactuca serriola*), wild mustard (*Sinapis arvensis*), wild radish, Woollyleaf Bursage (*Ambrosia grayi*), Woollywhite, Chalkhill (*Hymenopappus tenuifolius*), Woollywhite, Yellow (*Hymenopappus flavescens*), Wright Eryngo (*Eryngium heterophyllum*), Yellow Rocket (*Barbarea vulgaris*), Yellow Sweetclover (*Melilotus indica*), Nightshade, Eastern black (*Solanum ptycanthum*), Cockspur (*Echinochola crusgalli*), Large crabgrass (*Digitaria sanguinalis*), (*Septaria viridis*), Wild foxtail millet (*Setaria viridis*), Acalypha australis, Amaranth, powell (*Amaranthus powellii*), Broadleaf signalgrass (*Urochloa platyphylla*), Galinsoga (*Galinsoga parviflora*), Nightshade, black (*Solanum nigrum*), Nutsedge, yellow (*Cyperus esculentus*), Pigweed, smooth (*Amaranthus hybridus*), African turnip weed (*Sisymbrium thellungii*), Amsinckia/Yellow burweed (*Amsinckia* spp.), Ball mustard (*Neslia paniculata*), Boggabri weed/Dwarf amaranth (*Amaranthus macrocarpus*), volunteer oilseed rape (*Brassica napus*), Calomba daisy (*Pentzia suffruticosa*), Cape tulip (*Homeria* spp.), Charlock (*Sinapsis arvensis*), Volunteer Chickpeas (*Cicer arietinum*), subterranean clover (*Trifolium subterraneum*), Cutleaf mignonette (*Reseda lutea*), Denseflower fumitory (*Fumaria densiflora*), *Faba* beans (*Vicia faba*), Field peas (*Pisum sativum*), Hare's ear/Treacle mustard (*Conringia orientalis*), Indian hedge mustard (*Sisymbrium orientale*), Lincoln weed (*Diplotaxis tenuifolia*), Lupins (*Lupinus albus*), Mallee catchfly (*Silene apetala*), New Zealand spinach (*Tetragonia tetragonoides*), poppy (*Papaver rhoeas*), *Parthenium* weed (*Parthenium hysterophorus*), Paterson's curse/Salvation Jane (*Echium plantagineum*), redshank (*Polygonum persicaria*), Rough poppy (*Papaver hybridum*), Saltbush (*Atriplex muelleri*), Skeleton weed (*Eriogonum deflexum*), Slender celery (*Apium leptophyllum*), Smallflower fumitory (*Fumaria parviflora*), Sorrel (*Rumex acetoxella*), Soursob (*Oxalis pes-caprae*), Spiny Emex/Doublegee/Threecornered Jack (Polygonaceae), Stagger weed (*Stachys arvensis*), Stocksbill/Wild *geranium* (*Erodium* spp.), field pansy (*Viola arvensis*), Wild/Crow garlic (*Allium vineale*), Wild turnip (*Brassica tournefortii*).

Preferably, such weeds include *Amaranthus* spp., *Brassica* spp., *Chenopodium* spp., *Papaver* spp., *Polygonum* spp., *Rumex* spp., *Solanum* spp., *Stellaria* spp.

More preferably, such weeds include *Amaranthus macrocarpus, Amaranthus retroflexus, Brassica napus, Chenopodium album, Papaver rhoeas, Polygonum aviculare, Polygonum convolvulus, Polygonum persicaria, Rumex acetoxella, Rumex crispus, Solanum nigrum, Stellaria media.*

The total amount of (A) and (B) is from 5% to 99% by weight of the composition. The crystalline modification I of mesotrione may be present in the synergistic herbicidal composition of an embodiment of the invention in any suitable amount, and is generally present in an amount of from about 1% to about 90% by weight of the composition, preferably from about 1% to 80% by weight, more preferably from about 1% to about 70% by weight of the composition. The crystalline modification I of metsulfuronmethyl may be present in the synergistic herbicidal composition in any suitable amount, and is generally present in an amount of from about 1% to about 90% by weight of the composition, preferably from about 1% to about 80% by weight, more preferably from about 1% to about 70% by weight of the composition, more preferably from about 20% to about 60%.

(A) and (B) may be employed in the composition, method or use of an embodiment of the invention in any suitable weight ratio. The weight ratio of the crystalline modification I of mesotrione and the crystalline modification I of metsulfuron-methyl in the composition may be in the range of from about 200:1 to about 1:200, preferably from about 150:1 to about 1:50, more preferably from about 150:1 to about 1:25, still more preferably from about 150:1 to about 1:10, more preferably still from about 150:1 to about 1:1, 100:1 to about 1:1, about 50:1 to about 1:1, preferably from about 20:1 to about 1:1, most preferably 20:1.

In general, the application rate of the active ingredients depends on such factors as the type of weed, type of crop plant, soil type, season, climate, soil ecology and various other factors. The application rate of the composition for a given set of conditions can readily be determined by routine trials.

In general the composition or the method of an embodiment of the invention can be applied at an application rate of from about 0.005 kilograms/hectare (kg/ha) to about 5.0 kg/ha of the total amount of active ingredient (A) and (B) being applied. Preferably, the application rate is from about 0.01 kg/ha to 3.0 kg/ha of the active ingredients.

Preferably, the application rate of the active ingredients is from 1 to 1000 g/ha of (A) the crystalline modification I of mesotrione and from 0.1 to 250 g/ha of (B) the crystalline modification I of metsulfuron-methyl. More preferably, the application rate of the active ingredients is from 1 to 150 g/ha of (A) the crystalline modification I of mesotrione and from 1 to 80 g/ha of (B) the crystalline modification I of metsulfuron-methyl.

As noted above, in an embodiment of the invention, (A) the crystalline modification I of mesotrione and (B) the crystalline modification I of metsulfuron-methyl may be applied either separately or combined as part of a two-part herbicidal system, such as the composition of an embodiment of the invention. The composition is applied pre-planting, pre-emergence and/or post-emergence.

The compositions of embodiments of this invention can be formulated in conventional manner, for example by mixing (A) the crystalline modification I of mesotrione and (B) the crystalline modification I of metsulfuron-methyl with appropriate auxiliaries. Suitable auxiliaries will depend upon such factors as the type of formulation and will be known to the person skilled in the art.

In particular, the composition may further comprise one or more auxiliaries selected from extenders, carriers, solvents, surfactants, stabilizers, anti-foaming agents, anti-freezing agents, preservatives, antioxidants, colorants, thickening agents, solid adherents, fillers, wetting agents, dispersing agents, lubricants, anticaking agents, deformers and diluents. Such auxiliaries are known in the art and are commercially available. Their use in the formulation of the compositions of embodiments of the invention will be apparent to the person skilled in the art.

Suitable formulations for applying a combination of (A) and (B) include water-soluble concentrates (SL), emulsifiable concentrates (EC), emulsions (EW), micro-emulsions (ME), suspension concentrates (SC), oil-based suspension concentrates (OD), flowable suspensions (FS), water-dispersible granules (WG), water-soluble granules (SG), water-dispersible powders (WP), water soluble powders (SP), granules (GR), encapsulated granules (CG), fine granules (FG), macrogranules (GG), aqueous suspo-emulsions (SE), capsule suspensions (CS) and microgranules (MG). Preferred formulations are suspension concentrates (SC), water-dispersible granules (WG) and water-soluble granules (SG).

The composition may comprise one or more inert fillers. Such inert fillers are known in the art and available commercially. Suitable fillers include, for example, natural ground minerals, such as kaolins, aluminas, talc, chalk, quartz, attapulgite, montmorillonite, and diatomaceous earth, or synthetic ground minerals, such as highly dispersed silicic acid, aluminum oxide, silicates, and calcium phosphates and calcium hydrogen phosphates. Suitable inert fillers for granules include, for example, crushed and fractionated natural minerals, such as calcite, marble, pumice, sepiolite, and dolomite, or synthetic granules of inorganic and organic ground materials, as well as granules of organic material, such as sawdust, coconut husks, corn cobs, and tobacco stalks.

The composition may optionally include one or more surfactants which are preferably non-ionic, cationic and/or anionic in nature and surfactant mixtures which have good emulsifying, dispersing and wetting properties, depending upon the active compound/compounds being formulated. Suitable surfactants are known in the art and are commercially available.

Suitable anionic surfactants can be both so-called water-soluble soaps and water-soluble synthetic surface-active compounds. Soaps which may be used include the alkali metal, alkaline earth metal or substituted or unsubstituted ammonium salts of higher fatty acid ($C_{10}$ to $C_{22}$), for example the sodium or potassium salt of oleic or stearic acid, or of natural fatty acid mixtures.

The surfactant may comprise an emulsifier, dispersant or wetting agent of ionic or nonionic type. Examples of such agents include salts of polyacrylic acids, salts of lignosulphonic acid, salts of phenylsulphonic or naphthalenesulphonic acids, polycondensates of ethylene oxide with fatty alcohols or with fatty acids or with fatty amines, substituted phenols, especially alkylphenols, sulphosuccinic ester salts, taurine derivatives, especially alkyltaurates, and phosphoric esters of polyethoxylated phenols or alcohols.

The presence of at least one surfactant is generally required when the active compound and/or the inert carrier and/or auxiliary/adjuvant are insoluble in water and the vehicle for the final application of the composition is water.

The composition may optionally further comprise one or more polymeric stabilizers. Suitable polymeric stabilizers that may be used in an embodiment of the invention include, but are not limited to, polypropylene, polyisobutylene, polyisoprene, copolymers of monoolefins and diolefins, polyacrylates, polystyrene, polyvinyl acetate, polyurethanes or polyamides. Suitable stabilizers are known in the art and commercially available.

The surfactants and polymeric stabilizers mentioned above are generally believed to impart stability to the composition, in turn allowing the composition to be formulated, stored, transported and applied.

Suitable anti-foaming agents for use in the compositions include all substances which can normally be used for this purpose in agrochemical compositions. Suitable anti-foaming agents are known in the art and are available commercially. Particularly preferred antifoam agents are mixtures of polydimethylsiloxanes and perfluroalkylphosphonic acids, such as the silicone anti-foaming agents available from GE or Compton.

Suitable solvents for use in the compositions may be selected from all customary organic solvents which thoroughly dissolve the active compounds employed. Again, suitable organic solvents for (A) and (B) are known in the art. The following may be mentioned as being preferred: N-methyl pyrrolidone, N-octyl pyrrolidone, cyclohexyl-1-pyrrolidone; and a mixture of paraffinic, isoparaffinic, cycloparaffinic and aromatic hydrocarbons (available commercially as SOLVESSO™200). Suitable solvents are commercially available.

Suitable preservatives include all substances which can normally be used for this purpose in agrochemical compositions of this type and again are well known in the art.

Suitable examples that may be mentioned include PREVENTOL® (from Bayer AG) and PROXEL® (from Bayer AG).

The compositions may comprise an antioxidant. Suitable antioxidants are all substances which can normally be used for this purpose in agrochemical compositions, as is known in the art. Preference is given to butylated hydroxytoluene.

Suitable thickening agents for use in the compositions include all substances which can normally be used for this purpose in agrochemical compositions. Examples include xanthan gum, PVOH, cellulose and its derivatives, clay hydrated silicates, magnesium aluminum silicates or a mixture thereof. Again, such thickening agents are known in the art and available commercially.

The compositions may further comprise one or more solid adherents. Such adherents are known in the art and available commercially. They include organic adhesives, including tackifiers, such as celluloses of substituted celluloses, natural and synthetic polymers in the form of powders, granules, or lattices, and inorganic adhesives such as gypsum, silica, or cement.

In addition, depending upon the formulation, the composition according to the invention may also comprise water.

The formulated composition may for example be applied in spray form, for example employing appropriate dilutions using a diluent, such as water.

In the method and use of an embodiment of the invention, the combination of the active ingredients can be applied to the locus where control is desired, such as to the leaves of plants and/or the surrounding soil, by a convenient method.

In the event, (A) and (B) are applied simultaneously in an embodiment of the invention, they may be applied as a composition containing (A) and (B), in which case (A) and (B) can be obtained from a separate formulation source and mixed together (known as a tank-mix, ready-to-apply, spray broth, or slurry), optionally with other pesticides, or (A) and (B) can be obtained as a single formulation mixture source (known as a pre-mix, concentrate, formulated compound (or product)), and optionally mixed together with other pesticides.

In a preferred embodiment, the method and use of an embodiment of the invention employ a composition according to the invention.

The compositions according to the invention are distinguished by the fact that they are especially well tolerated by plants being treated and are environmentally friendly.

Methods for producing crystalline modification I of metsulfuron-methyl are described in Applicant's copending U.S. Ser. No. 14/926,058, filed on even date herewith, which is incorporated herein by reference in its entirety for all purposes. More particularly, according to an embodiment of the invention, crystalline modification I of metsulfuron-methyl is prepared by dissolving the amorphous metsulfuron-methyl in a solvent or a solvent mixture as a concentrated solution by heating from room temperature or ambient temperature to a temperature at or below the reflux temperature of the solvent or the solvent mixture. Preferably, the concentrated solutions can be prepared at the reflux temperature of the solvents. The concentration of the solution depends on the solubility of metsulfuron-methyl in the corresponding solvent or solvent mixture.

The concentrated homogeneous solution thus prepared as in step (i) is then cooled to room or ambient temperature or cooled to around 0° C. to 20° C. to crystallize the desired crystalline form from the solvent. The crystalline modification I of metsulfuron-methyl can also be crystallized out by concentrating the homogeneous solution by removing the solvent or solvent mixture to a certain volume, with or without applying vacuum, and below the reflux temperature of the solvent or the solvent mixture.

In another embodiment, crystallization of crystalline modification I of metsulfuron-methyl can also be obtained by adding seed crystals of the desired crystalline form during crystallization into a solution prepared in step (i), which can promote or accelerate the crystallization.

The seed crystal amount added to the concentrated solution is typically in the range of 0.001% to 10% by weight, more particularly in the range of 0.005% to 0.5% by weight, based on the weight of metsulfuron-methyl used for the preparation of concentrated solution in step (i). Preferably, the seed crystals are added to the concentrated solution at a temperature below the boiling point of the corresponding solvent or the solvent mixture.

Hence, the precipitation of the crystalline form I of metsulfuron-methyl can be effectively achieved from the concentrated solution by a skilled person.

The precipitated crystalline modification I of metsulfuron-methyl obtained from step (ii) is isolated by the usual solid component separating techniques from solutions, such as filtration, centrifugation or decantation. Then, the isolated solid will be washed with the same solvent or solvent mixture which was used for the preparation of concentrated solution in step (i). The washing is usually carried out using the corresponding solvent or solvent mixture between room temperature and 0° C. depending on the solubility of the crystal in order to avoid the loss of crystalline material in the corresponding washing solvent as much as possible.

Although the invention is described herein with reference to preferred embodiments and examples thereof, the scope of the invention is not limited only to those described embodiments. As will be apparent to persons skilled in the art, modifications and adaptations to the above-described invention can be made without departing from the spirit and scope of the invention, which is defined by the appended claims.

Embodiments of the invention will now be described, for illustrative purposes only, by way of the following examples.

EXAMPLES

Example 1—Preparation of the Crystalline Modification I Mesotrione

The crystalline modification I of mesotrione was prepared according to the method as mentioned in WO2006021743.

Mesotrione enolate suspension was filtered to remove any excess solid enolate. 50 mL of the filtered solution was placed in a reaction flask and heated to 40° C. The pH of the solution was adjusted to 2.8 by adding 10% HCl over 20 minutes. The crystals were allowed to stir for 20 minutes before isolation by filtration. The crystals were then washed with water and sucked dry on the filter.

Example 2—Preparation of the Crystalline Modification II Mesotrione

The crystalline modification II of mesotrione was prepared according to the method as mentioned in WO2006021743.

Mesotrione crystals were stirred with water in a reaction flask. The pH was increased to 12 by adding NaOH. 1.5 mL of 10% HCl was added over 15 minutes to reduce the pH of the solution to pH 4. Crystals were obtained.

Example 3—Preparation of Metsulfuron-Methyl

Metsulfuron-methyl was prepared according to a method mentioned in EP 0318276 A1.

To an anhydrous suspension of 1.4 g of 2-amino-4-methoxy-6-methyl-1,3,5-triazine in 25 ml of methylene chloride is added with stirring at ambient temperature and pressure 2.4 g of 2-methoxycarbonylbenzenesulfonyhisocyanate. The mixture is thereafter stirred for 16 hours and filtered. The filtrate is evaporated to dryness, the residue is triturated with butyl chloride and the product removed by filtration.

Figure 4:
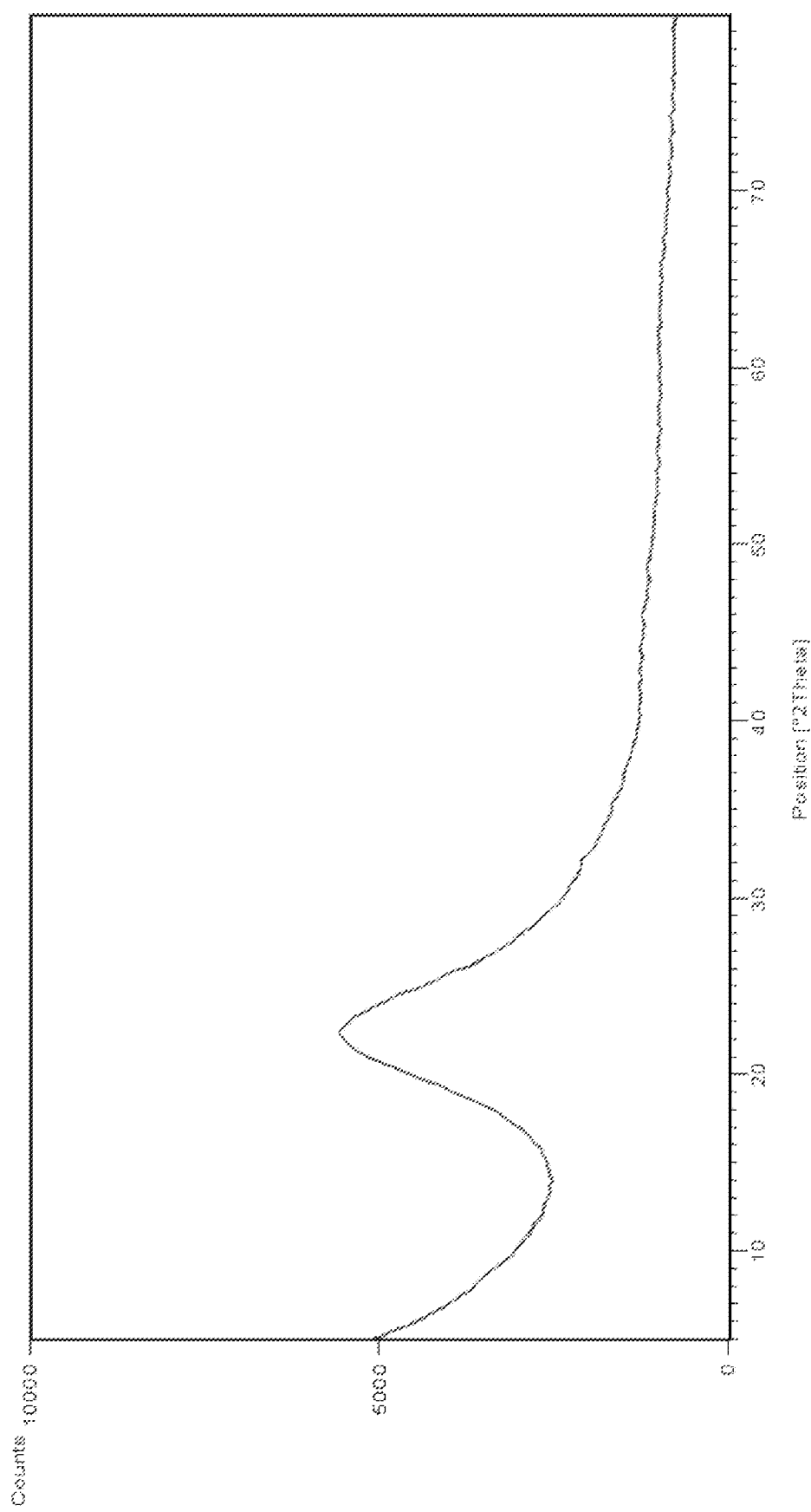
FIG. 4 is a graph showing the results of an X-ray powder diffractogram of amorphous metsulfuron-methyl.
Figures 5A, 5B:
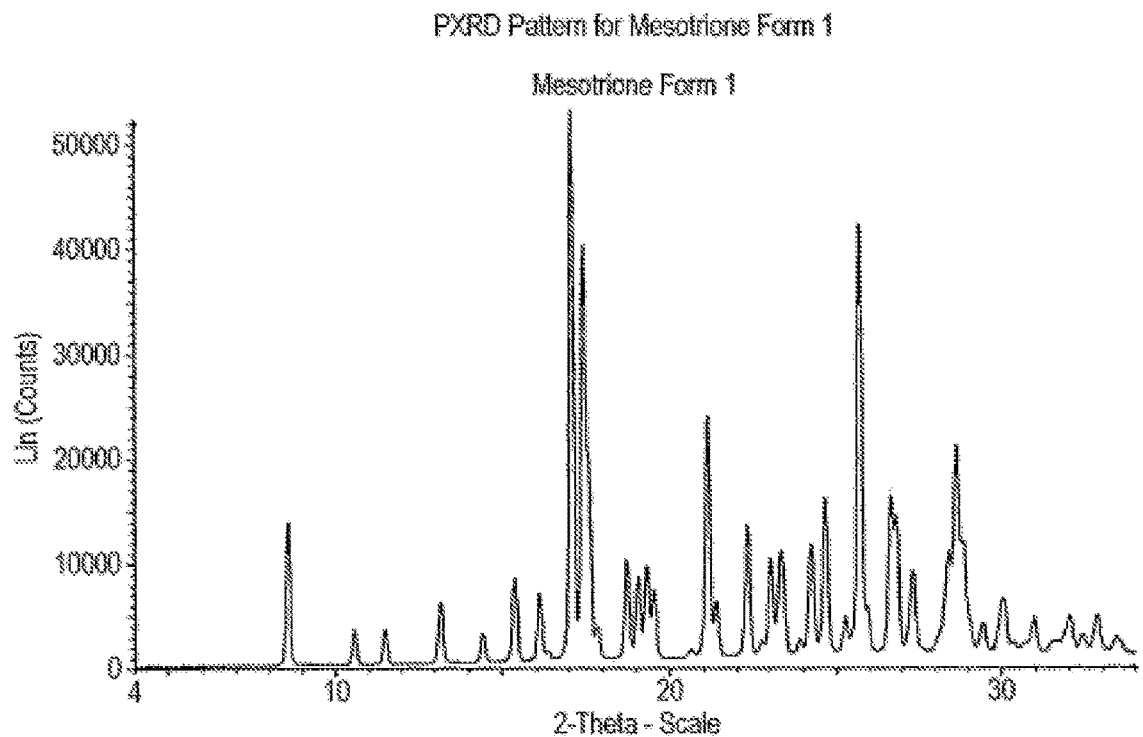
FIG. 5A is an X-ray powder diffractogram for mesotrione form I.
FIG. 5B is a table including data obtained from the X-ray powder diffractogram for mesotrione form I.
Figures 6A, 6B:
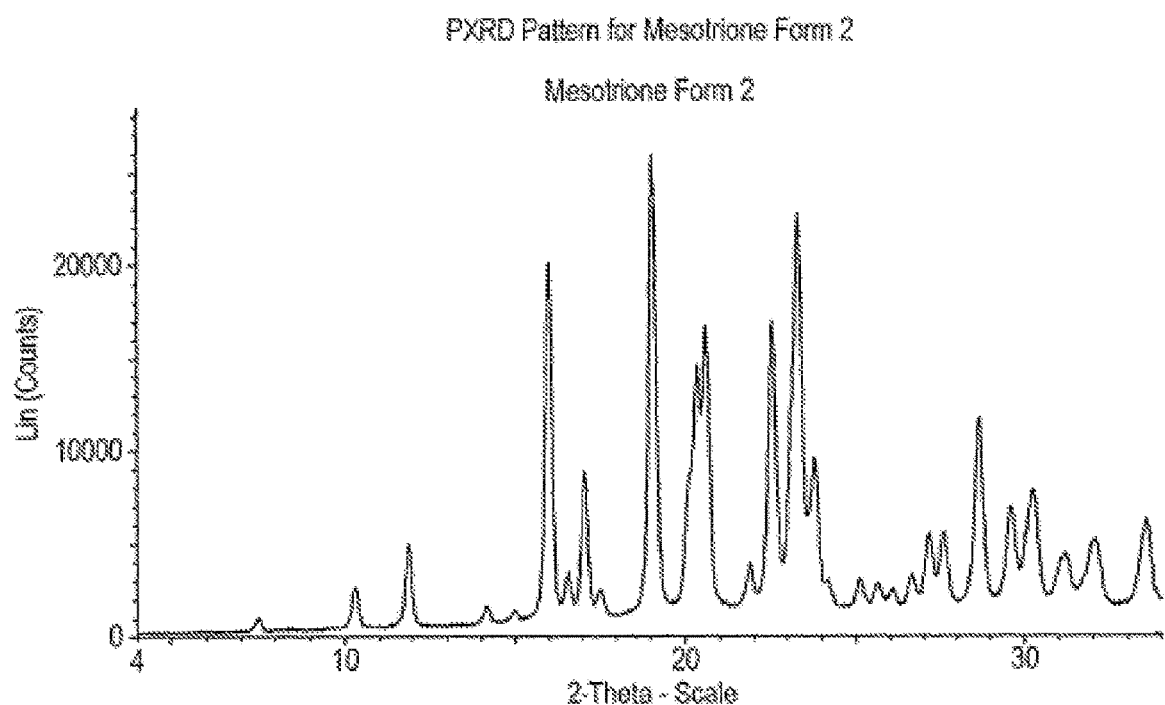
FIG. 6A is an X-ray powder diffractogram for mesotrione form II.
FIG. 6B is a table including data obtained from the X-ray powder diffractogram for mesotrione form II.
Figure 7:
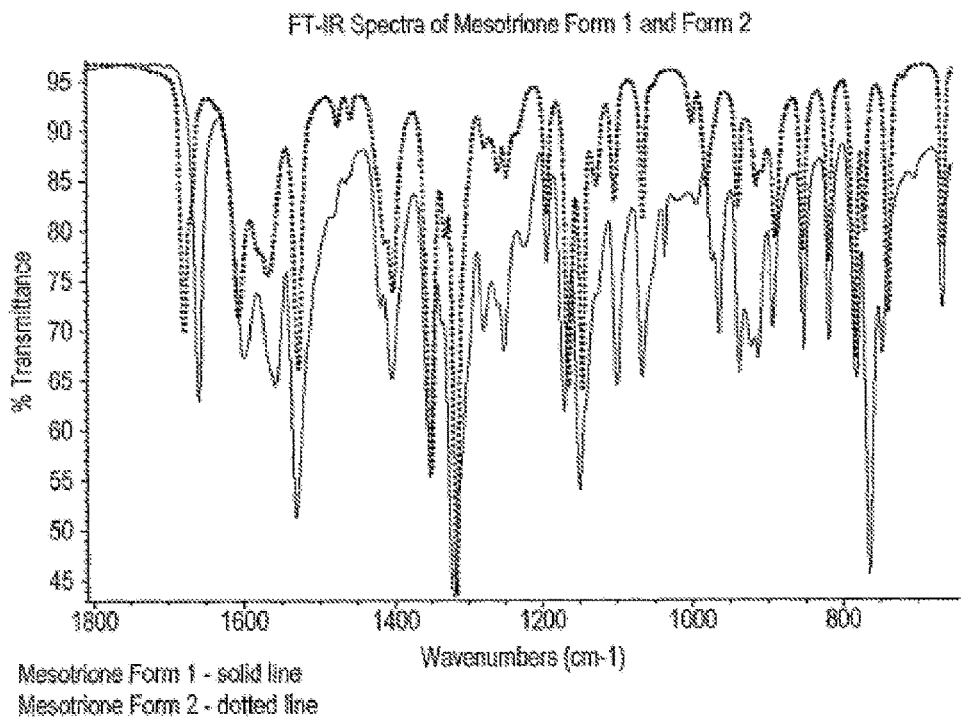
FIG. 7 is a graph comparing infrared patterns of mesotrione form I and mesotrione form II.
Figure 8A:
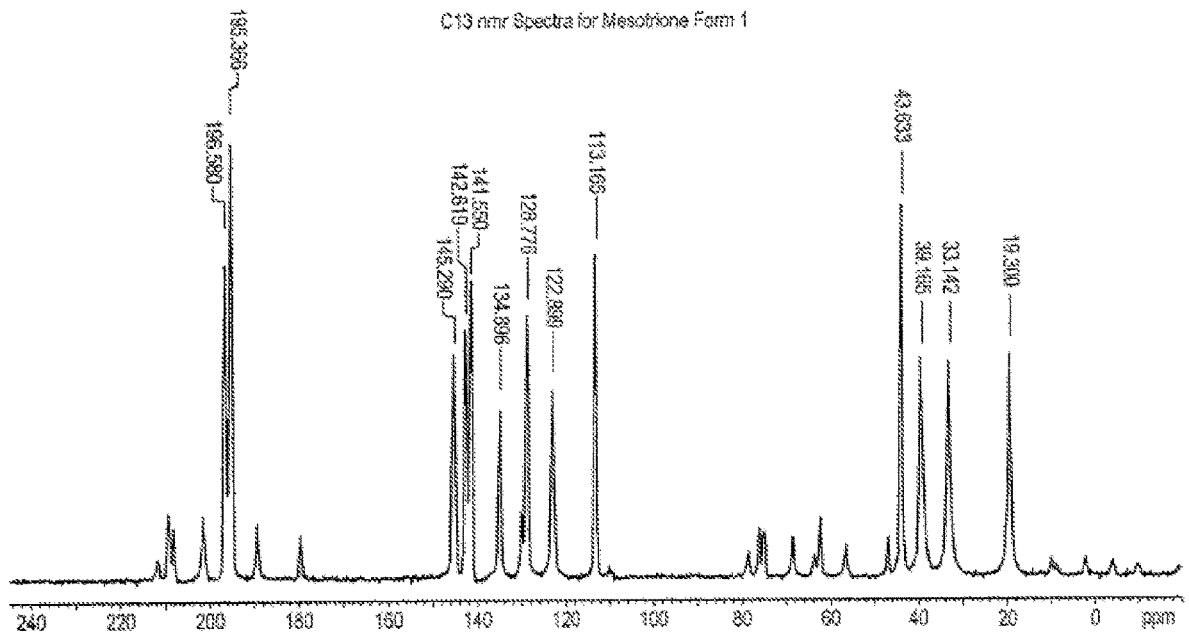
FIG. 8A is a C13 nmr specra for mesotrione form I.
Figures 8B, 8C:
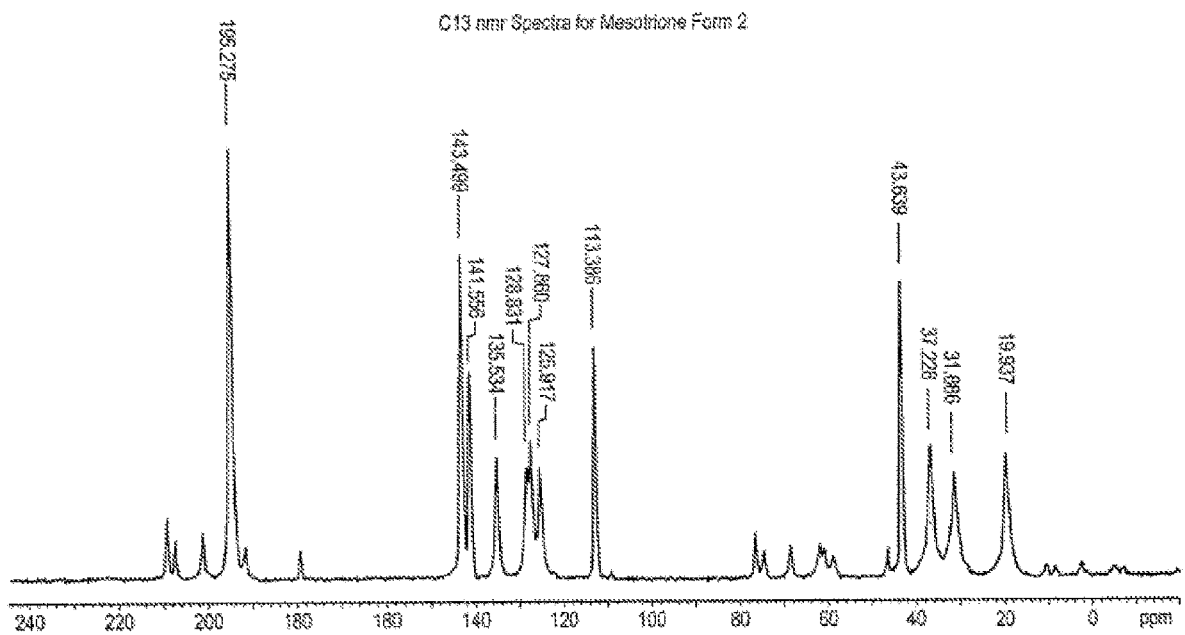
FIG. 8B is a C13 nmr specra for mesotrione form II.
FIG. 8C is a table including data and a comparison of the data from the C13 nmr specra for mesotrione form I and the C13 nmr specra for mesotrione form II.

As shown in FIG. 4, the X-ray powder diffraction pattern of the resulting metsulfuron-methyl product has no significant signals, which indicates the metsulfuron-methyl product prepared in accordance with the disclosure of EP 0318276 A1 is amorphous.

Example 4—Preparation of the Crystalline Modification I of Metsulfuron-Methyl Metsulfuron-methyl sample prepared as described in Example 3 (10 g) was taken in a three-neck round bottom flask along with method (60 mL) and the resulting slurry was heated to 50° C. to obtain a homogeneous solution. The insoluble particles, if any, were filtered and the solution was slowly cooled to room temperature. Upon cooling, fine crystals were formed and the heterogeneous mixture was stirred at room temperature for 2 h. Then, the slurry was filtered and washed with methanol (3 mL). The filtered crystals were dried under vacuum at 60° C. in order to remove the methanol traces from the crystalline product. The crystalline product thus obtained had a purity of >98% and the recovered crystalline product as crystal was found to be not less than 80% yield.

Figure 2:
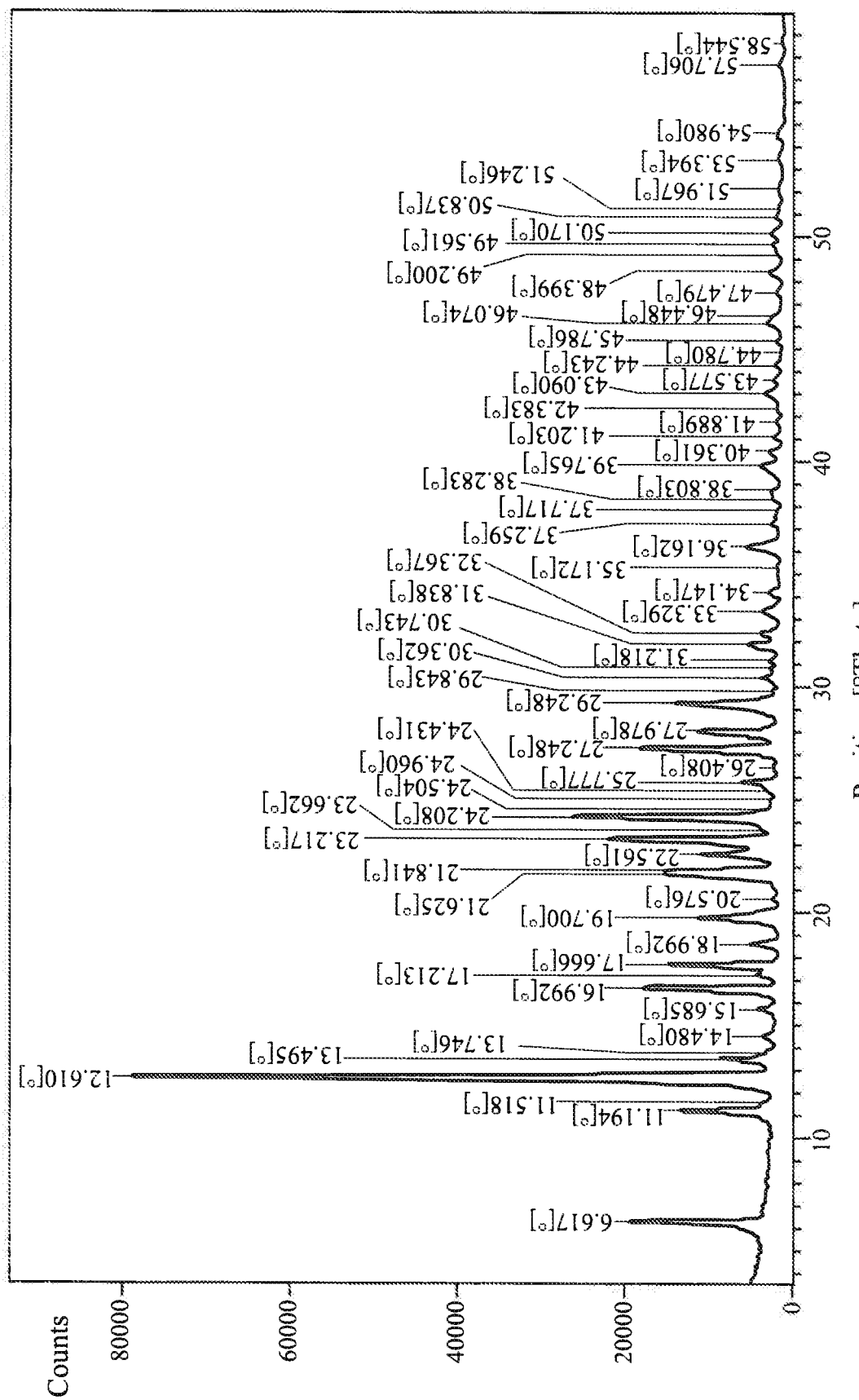
FIG. 2 is a graph showing the results of an X-ray powder diffractogram (XRD) of crystalline modification I of metsulfuron-methyl, according to an embodiment of the invention.

The obtained crystal product was analyzed by IR, powder X-ray and DSC analyses and found to be crystalline modification I of metsulfuron-methyl as shown in FIGS. 1, 2 and 3, respectively.

The differential scanning calorimetry (DSC) thermogram (FIG. 3) shows an endothermic melting peak with onset at 170.5° C. and peak maximum at 173.6° C.

The IR spectrum of metsulfuron-methyl shows the functional group characteristic vibrations at 3076.92, 2952.03, 2160.21, 2022.83, 1726.29 and 1702.52 cm$^{-1}$ as shown in FIG. 1.

The powder X-ray diffractogram of crystals showed the reflexes as shown in FIG. 2 and the values are summarized in Table 1.

TABLE 1

| Crystal Form A | |
|---|---|
| 2θ (°) | d (Å) |
| 6.28 ± 0.2 | 14.07 ± 0.05 |
| 12.61 ± 0.2 | 7.02 ± 0.05 |
| 13.50 ± 0.2 | 6.56 ± 0.05 |
| 16.59 ± 0.2 | 5.34 ± 0.05 |
| 17.66 ± 0.2 | 5.02 ± 0.05 |
| 19.70 ± 0.2 | 4.51 ± 0.05 |
| 21.63 ± 0.2 | 4.32 ± 0.05 |
| 21.84 ± 0.2 | 4.11 ± 0.05 |
| 23.22 ± 0.2 | 4.07 ± 0.05 |
| 24.21 ± 0.2 | 3.83 ± 0.05 |
| 27.25 ± 0.2 | 3.27 ± 0.05 |
| 27.98 ± 0.2 | 3.19 ± 0.05 |
| 29.25 ± 0.2 | 3.05 ± 0.05 |

Table 1. Powder X-ray diffractogram reflexes of crystalline modification I of metsulfuron-methyl

Formulation Examples

Water-dispersible granule (WG) was prepared by mixing and milling of active ingredients and auxiliaries (0.5% SUPRALATE® (sodium lauryl sulfate, Witco Inc., Greenwich), 5% REAX®88B (sodium lignosulfonate, Westvaco Corp), Potassium carbonate (balance to 100%)) under compressed air, then wetting, extruding and drying to obtain water-dispersible granule.

For example,

| | |
|---|---|
| The crystalline modification I of mesotrione | 50% |
| The crystalline modification I of metsulfuron-methyl | 1% |
| SUPRALATE ® (sodium lauryl sulfate, Witco Inc., Greenwich) | 0.5% |
| REAX ®88B (sodium lignosulfonate, Westvaco Corp) | 5% |
| Potassium carbonate | Balance to 100% |

Aqueous suspension concentrates (SC) were prepared by mixing finely ground active ingredients with auxiliaries (10% Propylene glycol, 5% Tristyrylphenol ethoxylates, 1% Sodium lignosulfonate, 1% Carboxymethylcellulose, 1% Silicone oil (in the form of a 75% emulsion in water), 0.1% Xanthan gum, 0.1% NIPACIDE BIT 20, Water (Balance to 1 L).

For example,

| | |
|---|---|
| The crystalline modification I of mesotrione | 40% |
| The crystalline modification I of metsulfuron-methyl | 2% |
| Propylene glycol | 10% |
| Tristyrylphenol ethoxylates | 5% |
| Sodium lignosulfonate | 1% |
| Carboxymethylcellulose | 1% |
| Silicone oil (in the form of a 75% emulsion in water) | 1% |
| Xanthan gum | 0.1% |
| NIPACIDE BIT 20 | 0.1% |
| Water | Balance to 1 L |

Water-soluble granules was prepared by mixing and milling of active ingredients and auxiliaries (0.5% SUPRALATE® (sodium lauryl sulfate, Witco Inc., Greenwich), 5% REAX®88B (sodium lignosulfonate, Westvaco Corp), 2% Sodium hydrogen carbonate (NaHCO$_3$), Potassium sulfate (balance to 100%)) under compressed air, then wetting, extruding and drying to obtain water-soluble granules.

Soluble-dispersible granule (SG) was prepared by mixing and milling of active ingredients and auxiliaries (0.5% SUPRALATE® (sodium lauryl sulfate, Witco Inc., Greenwich), 5% REAX®88B (sodium lignosulfonate, Westvaco Corp), 2% Sodium hydrogen carbonate, Potassium sulfate (balance to 100%)) under compressed air, then wetting, extruding and drying to obtain water-dispersible granule.

For example,

| | |
|---|---|
| The crystalline modification I of mesotrione | 25% |
| The crystalline modification I of metsulfuron-methyl | 4% |
| SUPRALATE ® (sodium lauryl sulfate, Witco Inc., Greenwich) | 0.5% |
| REAX ® 88B (sodium lignosulfonate, Westvaco Corp) | 5% |
| Sodium hydrogen carbonate (NaHCO$_3$) | 2% |
| Potassium sulfate | Balance to 100% |

Formulations were prepared according to the method above (Table A):

TABLE A

| No | Formulation type | Mesotrione (%) I | II | Metsulfuron-methyl (%) Amorphous | I |
|---|---|---|---|---|---|
| 1 | SC | 40 | / | / | / |
| 2 | SC | / | 40 | / | / |
| 3 | WG | / | / | 60 | / |
| 4 | WG | / | / | / | 60 |
| 5 | SC | 40 | / | 2 | / |
| 6 | SC | / | 40 | 2 | / |
| 7 | SC | 40 | / | / | 2 |
| 8 | SC | / | 40 | / | 2 |
| 9 | SC | 40 | / | / | 2 |
| 10 | WG | 50 | / | / | 1 |
| 11 | SC | 40 | / | / | 0.4 |
| 12 | SG | 25 | / | / | 4 |
| 13 | WG | 60 | / | / | 6 |
| 14 | SC | 20 | / | / | 20 |
| 15 | OD | 10 | / | / | 30 | whereby:

A=the activity percentage of compound A when active compound A is employed at an application rate of m g/ha;

B=the activity percentage of compound B when active compound B is employed at an application rate of n g/ha;

E=the percentage of estimated activity when compounds A and B are employed together at an application rate of m g/ha and n g/ha;

then:

$$E=A+B-(A\times B/100).$$

If the actual activity observed for the combination of compounds A and B is greater than that calculated, then the activity of the combination is superadditive. In other words, synergism is present.

Barley, wheat, corn and oilseed rape plants were sown side by side in the field. Different types of weeds and their relative density were recorded and are listed in Table 1 below. Formulations of Examples 1 to 8 above were applied 50 days after planting. After application, the beds were maintained for about 2 weeks. Two weeks after application, the beds were examined to determine the efficiency of the treatment. The results are set forth below in Table 2 below.

TABLE 1

| Type of weed | |
|---|---|
| Type of weed | Relative density (%) |
| Amaranthus macrocarpus | 25 |
| Amaranthus retroflexus | 15 |
| Rumex crispus | 15 |
| Polygonum persicaria | 10 |
| Stellaria media | 35 |

TABLE 2

| | | | Efficiency (%) | | | | |
|---|---|---|---|---|---|---|---|
| | | Metsulfon- | | Efficiency (%) Type of weed | | | |
| Formulation Examples | Mesotrione (g/ha) | methyl (g/ha) | Amaranthus macrocarpus | Amaranthus retroflexus | Rumex crispus | Polygonum persicaria | Stellaria media |
| Untreated | 0 | 0 | 0 | 0 | 0 | 0 | 0 |
| Example 1 | 100 | 0 | 30 | 35 | 30 | 25 | 30 |
| Example 2 | 100 | 0 | 35 | 35 | 30 | 25 | 25 |
| Example 3 | 0 | 5 | 25 | 25 | 25 | 20 | 20 |
| Example 4 | 0 | 5 | 30 | 30 | 25 | 25 | 25 |
| Example 5 | 100 | 5 | 65 | 70 | 65 | 60 | 65 |
| Example 6 | 100 | 5 | 55 | 55 | 55 | 50 | 55 |
| Example 7 | 100 | 5 | 95 | 100 | 100 | 95 | 100 |
| Example 8 | 100 | 5 | 60 | 70 | 70 | 65 | 70 |

Biological Examples 1

A synergistic effect exists with a combination of two active compounds when the activity of a composition comprising both active compounds is greater than the sum of the activities of the two active compounds applied individually. The expected activity for a given combination of two active compounds can be calculated by the so called "Colby equation" (see S. R. Colby, "Calculating Synergistic and Antagonistic Responses of Herbicide Combinations", Weeds 1967, 15, 20-22):

Biological Examples 2

Corn, oat, sugarcane and rye plants were sown side by side in the field. Different types of weeds and their relative density were recorded and are listed in Table 3 below. Formulations of Examples 9 to 15 above were applied 50 days after planting. After application, the beds were maintained for about 2 weeks. Two weeks after application, the beds were examined to determine the efficiency of the treatment. The results are set forth below in Table 4 below.

TABLE 3

| Type of weed | Relative density (%) |
|---|---|
| *Brassica napus* | 20 |
| *Chenopodium album* | 15 |
| *Papaver rhoeas* | 10 |
| *Polygonum aviculare* | 10 |
| *Polygonum convolvulus* | 20 |
| *Rumex acetoxella* | 10 |
| *Solanum nigrum* | 15 |

TABLE 4

| | | | Efficiency (%) Type of weed | | | | | | |
|---|---|---|---|---|---|---|---|---|---|
| Formulation Examples | Mesotrione (g/ha) | Metsulfuron-methyl (g/ha) | *Brassica napus* | *Chenopodium album* | *Papaver rhoeas* | *Polygonum aviculare* | *Polygonum convolvulus* | *Rumex acetoxella* | *Solanum nigrum* |
| Untreated | 0 | 0 | 0 | 0 | 0 | 0 | 0 | 0 | 0 |
| Example 9 | 100 | 5 | 100 | 95 | 95 | 95 | 100 | 100 | 100 |
| Example 10 | 125 | 2.5 | 90 | 90 | 90 | 90 | 90 | 85 | 85 |
| Example 11 | 150 | 1.5 | 85 | 80 | 85 | 85 | 85 | 85 | 80 |
| Example 12 | 50 | 8 | 95 | 90 | 95 | 90 | 95 | 90 | 100 |
| Example 13 | 150 | 15 | 95 | 90 | 95 | 95 | 100 | 95 | 95 |
| Example 14 | 30 | 30 | 90 | 85 | 90 | 85 | 90 | 85 | 85 |
| Example 15 | 20 | 60 | 75 | 70 | 80 | 75 | 80 | 70 | 65 |

The invention claimed is:

1. A composition comprising a herbicidally effective amount of
   (A) the crystalline modification I of 2-(4-mesyl-2-nitrobenzoyl)cyclohexane-1,3-dione (mesotrione), wherein the crystalline modification I of mesotrione is produced by filtering a suspension of mesotrione and enolate to remove excess solid enolate and provide a filtered solution, heating the solution, adjusting the pH of the solution by adding acid to the solution, isolating crystals from the solution by filtration, washing the crystals with water, and drying the crystals, wherein the crystalline modification I of mesotrione exhibits all of the following reflexes as 2θ values in an X-ray powder diffractogram recorded using Cu—Kα radiation at 25° C.:
   8.52
   17.08
   17.43
   18.74
   19.04
   19.31
   19.52
   21.15
   25.73
   28.66; and
   (B) the crystalline modification I of methyl 2-[[[[(4-methoxy-6-methyl-1,3,5-triazin-2-yl)amino]carbonyl]amino]sulfonyl]benzoate (metsulfuron-methyl), wherein the crystalline modification I of metsulfuron-methyl is prepared by heating a slurry of metsulfuron-methyl and methanol to obtain a homogenous solution, cooling the solution to room temperature to obtain a heterogeneous mixture including crystals, stirring the heterogeneous mixture to form a slurry, filtering the crystals from slurry, washing the filtered crystals, and drying the filtered crystals under vacuum, wherein the crystalline modification I of metsulfuron-methyl exhibits all of the following reflexes as 2θ values in an X-ray powder diffractogram recorded using Cu—Kα radiation at 25° C.:
   6.28±0.2
   12.61±0.2
   13.50±0.2
   16.59±0.2
   17.66±0.2
   19.70±0.2
   21.63±0.2
   21.84±0.2
   23.22±0.2
   24.21±0.2
   27.25±0.2
   27.98±0.2
   29.25±0.2.

2. The composition according to claim 1, wherein the weight ratio of (A) to (B) is in the range of from about 200:1 to about 1:200.

3. The composition according to claim 2, wherein the weight ratio of (A) to (B) is in the range of from 150:1 to about 1:1.

4. The composition according to claim 3, wherein the weight ratio of (A) to (B) is 20:1.

5. The composition according to claim 1, wherein the total amount of (A) and (B) is from 5% to 99% by weight of the composition.

6. The composition according to claim 5, wherein the composition comprises, by weight, from about 1% to about 90% of (A) and from about 1% to about 90% of (B).

7. The composition according to claim 5, wherein the composition comprises, by weight, from about 1% to about 70% of (A) and from about 1% to about 70% of (B).

8. The composition according to claim 1, further comprising one or more auxiliaries selected from extenders, carriers, solvents, surfactants, stabilizers, anti-foaming agents, anti-freezing agents, preservatives, antioxidants, colorants, thickening agents, solid adherents, fillers, wetting agents, dispersing agents, lubricants, anticaking agents, deformers and diluents.

9. The composition according to claim 1, being formulated as a water-soluble concentrate (SL), an emulsifiable concentrate (EC), an emulsion (EW), a micro-emulsion (ME), a suspension concentrate (SC), an oil-based suspension concentrate (OD), a flowable suspension (FS), a water-dispersible granule (WG), a water-soluble granule (SG), a water-dispersible powder (WP), a water soluble powder (SP), a granule (GR), an encapsulated granule (CG), a fine granule (FG), a macrogranule (GG), an aqueous suspoemulsion (SE), a capsule suspension (CS) or a microgranule (MG).

10. A method of controlling undesirable plant growth comprising applying to the plant or to the locus thereof a herbicidally effective amount of the herbicidal composition of claim 1.

11. The method according to claim 10, wherein the plant growth is being controlled in a crop comprising cereals, sugarcane, vegetables and oil plants.

12. The method according to claim 10, wherein the plant growth being controlled is of one or more of broadleaf weeds and grasses.

13. The method according to claim 12, wherein the plant growth being controlled is one or more of *Amaranthus* spp., *Brassica* spp., *Chenopodium* spp., *Papaver* spp., *Polygonum* spp., *Rumex* spp., *Solanum* spp., and *Stellaria* spp.

14. The method according to claim 10, wherein the composition is applied at an application rate of 0.005 kilograms/hectare (kg/ha) to about 5.0 kg/ha of the total amount of active ingredient (A) and (B) being applied.

15. The method according to claim 14, wherein the composition is applied at an application rate of from 0.01 kg/ha to 3.0 kg/ha of the total amount of active ingredient (A) and (B) being applied.

16. The method according to claim 15, wherein the composition is applied at an application rate of from 1 to 1000 g/ha of (A) and from 0.1 to 250 g/ha of (B).

17. The method according to claim 16, wherein the composition is applied at an application rate of from 1 to 150 g/ha of (A) and 1 to 80 g/ha of (B).

18. The method according to claim 10, wherein the composition is applied pre-planting, pre-emergence and/or post-emergence.

19. A method of controlling plant growth at a locus comprising applying to the locus herbicidally effective amounts of (A) the crystalline modification I of 2-(4-mesyl-2-nitrobenzoyl)cyclohexane-1,3-dione (mesotrione) and (B) the crystalline modification I of methyl 2-[[[[(4-methoxy-6-methyl-1,3,5-triazin-2-yl)amino]carbonyl]amino]sulfonyl] benzoate (metsulfuron-methyl),
wherein the crystalline modification I of mesotrione is produced by filtering a suspension of mesotrione and enolate to remove excess solid enolate and provide a filtered solution, heating the solution, adjusting the pH of the solution by adding acid to the solution, isolating crystals from the solution by filtration, washing the crystals with water, and drying the crystals, wherein the crystalline modification I of mesotrione exhibits all of the following reflexes as 2θ values in an X-ray powder diffractogram recorded using Cu—Kα radiation at 25° C.:

8.52
17.08
17.43
18.74
19.04
19.31
19.52
21.15
25.73
28.66; and wherein the crystalline modification I of metsulfuron-methyl is prepared by heating a slurry of metsulfuron-methyl and methanol to obtain a homogenous solution, cooling the solution to room temperature to obtain a heterogeneous mixture including crystals, stirring the heterogeneous mixture to form a slurry, filtering the crystals from slurry, washing the filtered crystals, and drying the filtered crystals under vacuum, wherein the crystalline modification I of metsulfuron-methyl exhibits all of the following reflexes as 2θ values in an X-ray powder diffractogram recorded using Cu—Kα radiation at 25° C.:

$6.28 \pm 0.2$ $12.61 \pm 0.2$ $13.50 \pm 0.2$ $16.59 \pm 0.2$ $17.66 \pm 0.2$ $19.70 \pm 0.2$ $21.63 \pm 0.2$ $21.84 \pm 0.2$ $23.22 \pm 0.2$ $24.21 \pm 0.2$ $27.25 \pm 0.2$ $27.98 \pm 0.2$ $29.25 \pm 0.2$.

20. The method according to claim 19, wherein the plant growth is being controlled in a crop comprising cereals, sugarcane, vegetables and oil plants.

21. The method according to claim 19, wherein (A) and (B) are applied to the locus at the same time.

22. The method according to claim 19, wherein (A) and (B) are applied to the locus consecutively.

23. The method according to claim 19, wherein the plant growth being controlled is of one or more of broadleaf weeds and grasses.

24. The method according to claim 23, wherein the plant growth being controlled is one or more of *Amaranthus* spp., *Brassica* spp., *Chenopodium* spp., *Papaver* spp., *Polygonum* spp., *Rumex* spp., *Solanum* spp., and *Stellaria* spp.

25. The method according to claim 19, wherein the weight ratio of (A) to (B) applied is in the range of from 200:1 to 1:200.

26. The method according to claim 25, wherein the weight ratio of (A) to (B) applied is in the range of from 150:1 to 1:1.

27. The method according to claim 26, wherein the weight ratio of (A) to (B) applied is 20:1.

28. The method according to claim 19, wherein (A) and (B) are applied at an application rate of 0.005 kilograms/ hectare (kg/ha) to about 5.0 kg/ha of the total amount of active ingredient (A) and (B) being applied.

29. The method according to claim 28, wherein (A) and (B) are applied at an application rate of from 0.01 kg/ha to 3.0 kg/ha of the total amount of active ingredient (A) and (B) being applied.

30. The method according to claim 29, wherein (A) and (B) are applied at an application rate of from 1 to 1000 g/ha of (A) and from 0.1 to 250 g/ha of (B).

31. The method according to claim 30, wherein (A) and (B) are applied at an application rate of from 1 to 150 g/ha of (A) and 1 to 80 g/ha of (B).

32. The method according to claim 19, wherein (A) and (B) are applied pre-planting, pre-emergence and/or post-emergence.

\* \* \* \* \*